(12) United States Patent
Song et al.

(10) Patent No.: US 12,311,292 B2
(45) Date of Patent: *May 27, 2025

(54) MANIFOLD ASSEMBLIES FOR FILTERS

(71) Applicant: AMOGREENTECH CO., LTD., Gimpo-si (KR)

(72) Inventors: Jae Kyung Song, Gimpo-si (KR); Kyoung Ku Han, Gimpo-si (KR); Sung Bin Lee, Gimpo-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 469 days.

This patent is subject to a terminal disclaimer.

(21) Appl. No.: 17/997,336

(22) PCT Filed: Apr. 27, 2021

(86) PCT No.: PCT/KR2021/005305
§ 371 (c)(1),
(2) Date: Oct. 27, 2022

(87) PCT Pub. No.: WO2021/221434
PCT Pub. Date: Nov. 4, 2021

(65) Prior Publication Data
US 2023/0166203 A1 Jun. 1, 2023

(30) Foreign Application Priority Data

Apr. 28, 2020 (KR) .......................... 10-2020-0051425

(51) Int. Cl.
*B01D 29/05* (2006.01)
*B01D 29/15* (2006.01)
(Continued)

(52) U.S. Cl.
CPC ............. *B01D 29/05* (2013.01); *B01D 29/15* (2013.01); *B01D 29/52* (2013.01); *C02F 1/001* (2013.01);
(Continued)

(58) Field of Classification Search
None
See application file for complete search history.

(56) References Cited

U.S. PATENT DOCUMENTS

| X6739 I1 * | 8/1831 | Barron .......................... 210/351 |
| 126,926 A * | 5/1872 | Brady ................ B01D 17/0211 |
| | | 210/182 |

(Continued)

FOREIGN PATENT DOCUMENTS

| JP | 2002113338 A | 4/2002 |
| JP | 2007061787 A | 3/2007 |

(Continued)

OTHER PUBLICATIONS

International Search Report issued in PCT/KR2021/005305 dated Aug. 13, 2021, 4 pages.

*Primary Examiner* — Robert J Popovics
(74) *Attorney, Agent, or Firm* — ROTHWELL, FIGG, ERNST & MANBECK, P.C.

(57) ABSTRACT

A filter module for a gravity-type water-purifying device including a plurality of plate-shaped filter members, which are in a plate shape having a predetermined area, produce filtered water from raw water introduced from the outside, and are spaced apart from each other in parallel along one direction while one surface of each filter member faces each other at a predetermined; and a filtered-water integrating member for fixing one side of each of the plate-shaped filter members so that the plurality of plate-shaped filter members can be kept spaced apart from each other along one direction while facing each other, and for integrating and discharging (Continued)

the filtered water individually produced from each of the plurality of plate-shaped filter members.

7 Claims, 9 Drawing Sheets

(51) Int. Cl.
*B01D 29/52* (2006.01)
*C02F 1/00* (2023.01)

(52) U.S. Cl.
CPC .... *B01D 2201/302* (2013.01); *B01D 2201/32* (2013.01); *B01D 2313/125* (2013.01)

(56) References Cited

U.S. PATENT DOCUMENTS

| | | | | | |
|---|---|---|---|---|---|
| 268,702 | A | * | 12/1882 | McBride | C02F 1/003 210/479 |
| 445,223 | A | * | 1/1891 | Knight | B01D 37/025 55/501 |
| 498,967 | A | * | 6/1893 | Benham | C02F 1/003 210/337 |
| 513,802 | A | * | 1/1894 | Luscombe | C02F 1/001 210/476 |
| 541,970 | A | * | 7/1895 | Harder | C02F 1/001 210/314 |
| 546,335 | A | * | 9/1895 | Philippe | B01D 27/02 210/458 |
| 546,343 | A | * | 9/1895 | Kight | B01D 25/26 210/406 |
| 569,382 | A | * | 10/1896 | Knight | B01D 39/1623 210/123 |
| 589,887 | A | * | 9/1897 | Ziegler | F25D 3/04 210/486 |
| 590,293 | A | * | 9/1897 | Allen et al. | C02F 1/003 210/477 |
| 604,984 | A | * | 5/1898 | Harder | C02F 1/001 210/477 |
| 610,527 | A | * | 9/1898 | Fischer | B01D 25/26 210/346 |
| 630,846 | A | * | 8/1899 | Bliss | B01D 29/33 210/462 |
| 645,500 | A | * | 3/1900 | Ziegler | B01D 25/26 210/473 |
| 719,438 | A | * | 2/1903 | Crossman | B01D 25/172 210/231 |
| 796,801 | A | * | 8/1905 | Breyer | B01D 39/18 210/500.1 |
| 896,360 | A | * | 8/1908 | Butters | B01D 21/0012 210/406 |
| 903,070 | A | * | 11/1908 | Farnell | C02F 1/003 210/290 |
| 956,366 | A | * | 4/1910 | Knock | B01D 25/26 210/237 |
| 967,905 | A | * | 8/1910 | Hagg | B01D 17/045 210/301 |
| 1,052,440 | A | * | 2/1913 | Hagg | B01D 37/025 210/474 |
| 1,157,776 | A | * | 10/1915 | Hagg | C02F 1/003 210/474 |
| 1,276,665 | A | * | 8/1918 | Leopold | C02F 1/001 210/292 |
| 1,370,470 | A | * | 3/1921 | Martel | B01D 29/01 210/461 |
| 1,401,199 | A | * | 12/1921 | Simpson | B01J 20/00 210/505 |
| 1,412,557 | A | * | 4/1922 | Fleetwood | B01D 29/52 210/346 |
| 1,432,522 | A | * | 10/1922 | Barnes | F25D 7/00 210/336 |
| 1,483,111 | A | * | 2/1924 | Price | B01D 25/26 210/323.1 |
| 1,521,100 | A | * | 12/1924 | House | C02F 1/003 210/336 |
| 1,531,095 | A | * | 3/1925 | Hoehn | B01D 29/39 210/346 |
| 1,547,855 | A | * | 7/1925 | Burson | C02F 1/00 210/474 |
| 1,621,684 | A | * | 3/1927 | Rabjohn | B01D 24/24 210/266 |
| 1,629,269 | A | * | 5/1927 | Hagg | C02F 1/003 210/462 |
| 1,674,203 | A | * | 6/1928 | Holz | C02F 1/001 210/489 |
| 1,723,274 | A | * | 8/1929 | Fife | B01D 29/23 210/346 |
| 1,742,964 | A | * | 1/1930 | McNally | A01J 11/06 210/463 |
| 1,748,654 | A | * | 2/1930 | Palmer | C02F 1/645 210/474 |
| 1,818,623 | A | * | 8/1931 | Holcomb | B01D 29/39 210/461 |
| 1,919,448 | A | * | 7/1933 | Norquist | B01D 29/66 210/313 |
| 1,982,924 | A | * | 12/1934 | Norquist | B01D 29/39 210/486 |
| 2,002,826 | A | * | 5/1935 | Moran | B01D 29/39 210/346 |
| 2,013,776 | A | * | 9/1935 | Wiesman | B01D 25/26 210/396 |
| 2,024,426 | A | * | 12/1935 | Butler | B01D 33/25 210/388 |
| 2,028,466 | A | * | 1/1936 | Moran | B01D 29/39 210/486 |
| 2,041,495 | A | * | 5/1936 | Schwiers | B01D 29/66 210/420 |
| 2,198,175 | A | * | 4/1940 | Palkin | B01D 29/41 210/347 |
| 2,285,048 | A | * | 6/1942 | Palkin | B01D 29/39 210/346 |
| 2,306,986 | A | * | 12/1942 | Tolman | B01D 39/2003 210/486 |
| 2,351,332 | A | * | 6/1944 | Goodloe | B01D 29/15 210/346 |
| 2,359,138 | A | * | 9/1944 | Martin | D06F 43/085 210/167.01 |
| 2,359,368 | A | * | 10/1944 | Klopfenstein | B01D 29/39 210/461 |
| 2,374,094 | A | * | 4/1945 | Harvuot | B01D 21/34 210/86 |
| 2,409,705 | A | * | 10/1946 | Reinhardt | B01D 29/39 210/486 |
| 2,426,618 | A | * | 9/1947 | Klein | B01D 25/26 210/486 |
| 2,443,087 | A | * | 6/1948 | Ulrich | B01D 29/39 210/486 |
| 2,457,449 | A | * | 12/1948 | Davis | B01D 29/395 210/345 |
| 2,468,296 | A | * | 4/1949 | Jacobowitz | B01D 29/39 210/486 |
| 2,540,362 | A | * | 2/1951 | Hammond | B01D 29/395 210/306 |
| 2,552,305 | A | * | 5/1951 | Benedict | B01D 29/39 210/346 |
| 2,574,251 | A | * | 11/1951 | Dinley | D06F 43/02 68/24 |
| 2,582,311 | A | * | 1/1952 | Creswick | B01D 29/395 210/94 |
| 2,691,445 | A | * | 10/1954 | Eickemeyer | B01D 29/395 210/457 |
| 2,705,221 | A | * | 3/1955 | Clark | B03C 5/02 204/662 |
| 2,751,034 | A | * | 6/1956 | Ringo | B01D 53/26 137/625.11 |
| 2,788,901 | A | * | 4/1957 | Boeddinghaus | B01D 29/111 210/486 |
| 2,828,017 | A | * | 3/1958 | Petter | D21G 9/0009 55/303 |

(56) References Cited

U.S. PATENT DOCUMENTS

| | | | | |
|---|---|---|---|---|
| 2,887,228 A * | 5/1959 | Harlan | B01D 35/027 | 210/411 |
| 2,902,165 A * | 9/1959 | Imershein | B01D 29/39 | 210/231 |
| 2,909,285 A * | 10/1959 | Besler | B01D 29/94 | 210/330 |
| 2,940,595 A * | 6/1960 | Crane | B01D 35/12 | 210/333.1 |
| 2,964,194 A * | 12/1960 | Oliver, Jr. | B01D 33/23 | 210/486 |
| 2,970,696 A * | 2/1961 | Mummert | B01D 35/12 | 210/138 |
| 3,019,904 A * | 2/1962 | Stecher | B01D 17/10 | 210/DIG. 5 |
| 3,074,561 A * | 1/1963 | Mummert | B01D 29/668 | 210/426 |
| 3,168,469 A * | 2/1965 | Abdalian | D06F 43/085 | 210/333.1 |
| 3,193,100 A * | 7/1965 | Broughton | B01D 35/143 | 210/411 |
| 3,195,729 A * | 7/1965 | Kracklauer | B01D 35/20 | 210/330 |
| 3,202,284 A * | 8/1965 | Wade | B01D 33/25 | 210/345 |
| 3,212,643 A * | 12/1965 | Zievers | B01D 29/72 | 55/300 |
| 3,266,629 A * | 8/1966 | Megibow | B01D 63/0822 | 210/346 |
| 3,283,354 A * | 11/1966 | Simmons | F16L 55/46 | 15/104.062 |
| 3,295,687 A * | 1/1967 | Schmerler | B01D 29/39 | 55/379 |
| 3,298,672 A * | 1/1967 | Fordyce | F28F 25/06 | 261/DIG. 11 |
| 3,339,742 A * | 9/1967 | Kracklauer | B01D 29/39 | 210/232 |
| 3,399,776 A * | 9/1968 | Knuth | B01D 29/96 | 210/420 |
| 3,494,465 A * | 2/1970 | Nyrop | B01D 63/082 | 210/194 |
| 3,499,535 A * | 3/1970 | Riley | B01D 29/72 | 210/346 |
| 3,522,886 A * | 8/1970 | Clinton | B01D 25/30 | 210/345 |
| 3,598,243 A * | 8/1971 | Gutkowski | B01D 29/52 | 210/340 |
| 3,617,541 A * | 11/1971 | Pan | C02F 3/06 | 210/615 |
| 3,623,614 A * | 11/1971 | Schmidt, Jr. | B01D 29/111 | 210/486 |
| 3,625,365 A * | 12/1971 | Armstrong | B01D 24/14 | 210/279 |
| 3,648,844 A * | 3/1972 | Krynski | B01D 33/23 | 210/331 |
| 3,730,353 A * | 5/1973 | Trasen | B01D 63/089 | 210/455 |
| 3,735,872 A * | 5/1973 | Anderson | B01D 29/606 | 210/167.31 |
| 3,744,641 A * | 7/1973 | Schmidt, Jr. | B01D 29/39 | 210/486 |
| 3,747,768 A * | 7/1973 | Barrera | B01D 24/4876 | 210/288 |
| 3,756,275 A * | 9/1973 | Barrera | F16K 11/0743 | 137/590 |
| 3,756,417 A * | 9/1973 | MacQuilkin | B01D 29/39 | 264/347 |
| 3,765,441 A * | 10/1973 | Chang | F15B 13/081 | 137/271 |
| 3,795,320 A * | 3/1974 | Ehret | B01D 29/68 | 210/486 |
| 3,826,375 A * | 7/1974 | Fournier | B01J 47/022 | 210/291 |
| 3,836,002 A * | 9/1974 | Radford | B01D 29/39 | 210/232 |
| D235,998 S * | 7/1975 | Smith et al. | D23/263 | |
| 4,016,078 A * | 4/1977 | Clark | B01D 65/00 | 210/94 |
| 4,070,045 A * | 1/1978 | Colter | F16L 37/26 | 285/421 |
| 4,087,327 A * | 5/1978 | Feder | C12M 23/04 | 435/399 |
| 4,098,695 A * | 7/1978 | Novotny | B01D 24/14 | 210/279 |
| 4,113,623 A * | 9/1978 | Koether | A47J 37/1223 | 210/167.28 |
| 4,115,274 A * | 9/1978 | Boddeker | B01D 61/08 | 210/488 |
| 4,134,836 A * | 1/1979 | Rowley | B01D 29/15 | 210/240 |
| 4,169,793 A * | 10/1979 | Lockshaw | B01D 24/14 | 210/167.13 |
| 4,192,750 A * | 3/1980 | Elfes | B01D 29/92 | 210/232 |
| 4,200,536 A * | 4/1980 | Kaufman | B01D 24/4631 | 210/291 |
| 4,303,518 A * | 12/1981 | Grosshandler | B01D 29/96 | 210/453 |
| 4,307,503 A * | 12/1981 | Auld | B01D 25/215 | 160/371 |
| 4,348,284 A * | 9/1982 | Peer | B01D 29/39 | 210/486 |
| 4,364,830 A * | 12/1982 | Roberts | B01D 24/42 | 210/268 |
| 4,414,109 A * | 11/1983 | Aurthur | B01D 24/14 | 210/278 |
| 4,476,015 A * | 10/1984 | Schmitt | B01D 61/08 | 210/93 |
| 4,519,903 A * | 5/1985 | Johnson | B01D 29/39 | 210/94 |
| 4,533,020 A * | 8/1985 | Yamazaki | F16N 7/34 | 285/364 |
| 4,579,656 A * | 4/1986 | Johnson | B01D 29/39 | 210/234 |
| 4,622,137 A * | 11/1986 | Kessler | B01D 29/15 | 210/167.13 |
| 4,632,745 A * | 12/1986 | Giuffrida | C02F 1/4695 | 204/632 |
| 4,637,874 A * | 1/1987 | Ansteth | B01D 35/303 | 210/232 |
| 4,657,673 A * | 4/1987 | Kessler | B01D 24/14 | 210/167.13 |
| 4,735,716 A * | 4/1988 | Petrucci | B01D 46/0004 | 210/500.21 |
| 4,737,176 A * | 4/1988 | Lippert | B01D 46/12 | 210/345 |
| 4,753,726 A * | 6/1988 | Suchanek | B01D 24/4876 | 210/279 |
| 4,769,136 A * | 9/1988 | McCormick | B01D 35/12 | 74/606 R |
| 4,790,935 A * | 12/1988 | Johnson | B01D 29/92 | 210/232 |
| 4,806,240 A * | 2/1989 | Giordano | B01D 27/08 | 210/232 |
| 4,834,873 A * | 5/1989 | Burrows | B01D 61/081 | 210/257.2 |
| 4,859,332 A * | 8/1989 | Johnson | B01D 29/66 | 210/486 |
| 4,876,012 A * | 10/1989 | Kopp | B01D 65/02 | 210/644 |
| 4,877,521 A * | 10/1989 | Petrucci | B01D 29/018 | 210/450 |
| 4,904,382 A * | 2/1990 | Thomsen | B01D 35/153 | 55/504 |
| 4,909,937 A * | 3/1990 | Hoffmann | B01D 37/02 | 210/493.2 |
| 4,919,805 A * | 4/1990 | Johnson | B01D 29/885 | 210/416.1 |

(56) References Cited

U.S. PATENT DOCUMENTS

| | | | | |
|---|---|---|---|---|
| 4,944,887 A * | 7/1990 | Frederick | B01D 29/70 | 210/791 |
| 4,964,987 A * | 10/1990 | Johnson | B01D 29/39 | 210/538 |
| 4,966,718 A * | 10/1990 | Johnson | B01D 29/904 | 210/791 |
| 4,968,423 A * | 11/1990 | McKale | B01D 29/43 | 210/486 |
| 5,002,664 A * | 3/1991 | Clack | B01D 65/00 | 210/432 |
| 5,006,265 A * | 4/1991 | Kar | B01D 29/46 | 210/779 |
| 5,008,008 A * | 4/1991 | Lockshaw | B01D 29/395 | 210/167.13 |
| 5,035,799 A * | 7/1991 | Rosberg | B01D 29/66 | 210/411 |
| 5,045,197 A * | 9/1991 | Burrows | B01D 61/081 | 210/321.78 |
| 5,068,033 A * | 11/1991 | Tobias | B01D 24/14 | 210/345 |
| 5,089,131 A * | 2/1992 | Gentry | B01D 29/52 | 210/450 |
| 5,094,750 A * | 3/1992 | Kopp | F28F 13/00 | 210/321.81 |
| 5,104,535 A * | 4/1992 | Cote | B01D 63/0231 | 210/321.89 |
| 5,108,598 A * | 4/1992 | Posner | C02F 1/444 | 210/232 |
| 5,120,501 A * | 6/1992 | Mathewson | A61M 1/1629 | 165/182 |
| 5,128,035 A * | 7/1992 | Clack | B01D 61/12 | 210/432 |
| 5,128,036 A * | 7/1992 | Svensson | C02F 1/003 | 210/264 |
| 5,139,658 A * | 8/1992 | Hodge | B01D 27/08 | 210/DIG. 17 |
| 5,143,601 A * | 9/1992 | Slovak | B01D 61/10 | 210/90 |
| 5,147,542 A * | 9/1992 | Proulx | B01D 63/082 | 210/321.75 |
| 5,162,101 A * | 11/1992 | Cosentino | F28F 21/062 | 422/46 |
| D331,619 S * | 12/1992 | Biltoft | D23/209 | |
| 5,176,828 A * | 1/1993 | Proulx | B01D 65/00 | 210/321.75 |
| 5,180,488 A * | 1/1993 | Dietrick | B01D 29/41 | 210/232 |
| 5,182,019 A * | 1/1993 | Cote | B01D 63/04 | 210/321.89 |
| 5,194,149 A * | 3/1993 | Selbie | B01D 63/046 | 210/232 |
| D334,614 S * | 4/1993 | Biltoft | D23/209 | |
| 5,221,469 A * | 6/1993 | Nehls | B01D 29/94 | 210/167.04 |
| 5,230,796 A * | 7/1993 | Ter Meulen | B01D 63/043 | 210/321.89 |
| 5,279,734 A * | 1/1994 | Nehls | B01D 29/606 | 210/345 |
| 5,297,700 A * | 3/1994 | Burrows | B67D 3/0038 | 222/146.6 |
| 5,338,512 A * | 8/1994 | Mathewson | A61M 1/3623 | 422/46 |
| 5,342,518 A * | 8/1994 | Posner | B01D 65/08 | 210/232 |
| 5,356,692 A * | 10/1994 | Perez | B29C 70/16 | 428/116 |
| 5,362,384 A * | 11/1994 | Whetsel | B01D 24/4636 | 210/275 |
| 5,389,260 A * | 2/1995 | Hemp | B01D 65/00 | 210/450 |
| 5,401,399 A * | 3/1995 | Magnusson | A61L 2/18 | 210/136 |
| 5,405,528 A * | 4/1995 | Selbie | B01D 63/046 | 210/232 |
| 5,407,571 A * | 4/1995 | Rothwell | B01D 35/303 | 210/252 |
| 5,417,101 A * | 5/1995 | Weich | B01D 29/114 | 73/40 |
| 5,435,909 A * | 7/1995 | Burrows | G01N 27/06 | 210/257.2 |
| 5,476,526 A * | 12/1995 | Attermeyer | B01D 46/0002 | 55/496 |
| 5,527,450 A * | 6/1996 | Burrows | B01D 61/12 | 210/85 |
| 5,567,308 A * | 10/1996 | Visser | C02F 1/003 | 210/477 |
| 5,580,444 A * | 12/1996 | Burrows | G05D 21/02 | 210/257.2 |
| 5,599,447 A * | 2/1997 | Pearl | B01D 65/00 | 210/321.75 |
| 5,611,924 A * | 3/1997 | Osborne | B01D 29/52 | 210/330 |
| 5,612,983 A * | 3/1997 | Henriksson | G21C 15/182 | 210/411 |
| 5,616,243 A * | 4/1997 | Levy | A23L 2/72 | 210/473 |
| 5,651,887 A * | 7/1997 | Posner | B01D 35/147 | 210/232 |
| 5,653,878 A * | 8/1997 | Reid | B67D 3/0048 | 210/474 |
| 5,660,607 A * | 8/1997 | Jokschas | B01D 46/62 | 55/498 |
| 5,680,883 A * | 10/1997 | Gluf, Jr. | F15B 13/0892 | 137/550 |
| 5,706,982 A * | 1/1998 | Siddiqui | B29B 13/022 | 210/108 |
| 5,714,062 A * | 2/1998 | Winkler | C02F 3/20 | 210/220 |
| 5,753,107 A * | 5/1998 | Magnusson | B01D 35/306 | 210/136 |
| D396,726 S * | 8/1998 | Sadr | D15/5 | |
| 5,918,264 A * | 6/1999 | Drummond | B01D 65/102 | 73/40 |
| 5,925,245 A * | 7/1999 | Bradford | F02M 37/42 | 210/450 |
| 5,942,113 A * | 8/1999 | Morimura | B01D 39/2065 | 210/488 |
| 6,017,451 A * | 1/2000 | Kopf | B01D 29/90 | 210/345 |
| 6,042,677 A * | 3/2000 | Mahendran | B01D 63/023 | 210/321.89 |
| 6,048,455 A * | 4/2000 | Janik | B01D 27/06 | 210/438 |
| 6,068,770 A * | 5/2000 | Niermeyer | B01D 61/20 | 210/450 |
| 6,077,435 A * | 6/2000 | Beck | B01D 37/046 | 210/741 |
| 6,080,313 A * | 6/2000 | Kelada | C02F 9/20 | 210/266 |
| 6,103,118 A * | 8/2000 | Ter Meulen | F28D 7/0083 | 210/321.89 |
| 6,129,841 A * | 10/2000 | Dann | C02F 1/003 | 210/260 |
| 6,139,741 A * | 10/2000 | McGibbon | B01D 35/303 | 210/232 |
| 6,193,890 B1 * | 2/2001 | Pedersen | B01D 61/18 | 210/636 |
| 6,248,244 B1 * | 6/2001 | Dann | C02F 1/003 | 210/764 |
| 6,254,773 B1 * | 7/2001 | Biltoft | B01D 63/043 | 210/321.89 |
| 6,254,774 B1 * | 7/2001 | Henderson | B01D 29/96 | 376/313 |
| D446,791 S * | 8/2001 | Beckham | D15/1 | |
| 6,284,135 B1 * | 9/2001 | Ookata | B01D 61/18 | 210/220 |
| 6,294,039 B1 * | 9/2001 | Mahendran | B01D 65/02 | 156/245 |

(56) References Cited

U.S. PATENT DOCUMENTS

| | | | | |
|---|---|---|---|---|
| 6,325,422 B1* | 12/2001 | Verkaart | F04B 43/1284 | 604/408 |
| 6,325,928 B1* | 12/2001 | Pedersen | B01D 61/20 | 210/321.89 |
| 6,331,246 B1* | 12/2001 | Beckham | B01D 35/30 | 210/136 |
| 6,332,977 B1* | 12/2001 | Janecek | B01D 37/02 | 210/96.1 |
| 6,378,907 B1* | 4/2002 | Campbell | B01D 35/30 | 285/124.1 |
| 6,379,560 B1* | 4/2002 | Tilp | C02F 9/20 | 210/748.11 |
| 6,419,821 B1* | 7/2002 | Gadgil | B01D 39/2068 | 210/256 |
| 6,488,842 B2* | 12/2002 | Nagaoka | B01D 29/58 | 210/411 |
| 6,511,165 B1* | 1/2003 | Barinaga | B41J 2/17523 | 347/85 |
| 6,524,477 B1* | 2/2003 | Hughes | C02F 1/003 | 210/477 |
| 6,524,481 B2* | 2/2003 | Zha | B01D 65/02 | 210/321.89 |
| 6,555,005 B1* | 4/2003 | Zha | B01D 63/16 | 210/321.89 |
| 6,592,758 B2* | 7/2003 | Quintel | B01D 29/668 | 210/411 |
| D478,913 S * | 8/2003 | Johnson | D15/5 | |
| 6,602,425 B2* | 8/2003 | Gadgil | B01D 39/2068 | 210/744 |
| 6,709,586 B2* | 3/2004 | Mason | B01D 29/96 | 210/411 |
| 6,740,235 B2* | 5/2004 | Gill | B01D 35/30 | 210/252 |
| 6,776,906 B2* | 8/2004 | Reid | B01D 46/2411 | 210/232 |
| 6,790,360 B1* | 9/2004 | Pedersen | B01D 63/16 | 210/636 |
| 6,800,199 B1* | 10/2004 | Rhee | B01D 35/30 | 210/257.2 |
| 6,843,912 B2* | 1/2005 | Chaney | B01D 35/157 | 210/418 |
| 6,858,140 B2* | 2/2005 | Smith | B01D 29/39 | 210/411 |
| 6,872,305 B2* | 3/2005 | Johnson | B01D 65/02 | 210/330 |
| 6,899,811 B2* | 5/2005 | Cote | C02F 1/444 | 210/257.2 |
| 6,918,952 B2* | 7/2005 | van der Maas | G01N 1/4077 | 96/147 |
| 6,926,826 B2* | 8/2005 | Reid | B01D 35/301 | 285/376 |
| 6,959,817 B2* | 11/2005 | Claypoole | B01D 29/39 | 210/411 |
| 6,969,462 B2* | 11/2005 | Liang | B01D 61/10 | 210/103 |
| D513,304 S * | 12/2005 | Suzuki | D23/209 | |
| 7,014,759 B2* | 3/2006 | Radford | C02F 1/003 | 141/330 |
| 7,021,667 B2* | 4/2006 | Campbell | B01D 65/00 | 285/124.1 |
| 7,037,424 B2* | 5/2006 | Niermeyer | B01D 65/00 | 210/450 |
| 7,037,426 B2* | 5/2006 | Pedersen | C02F 1/444 | 210/257.2 |
| 7,135,114 B2* | 11/2006 | Nonninger | B01D 63/0821 | 55/482 |
| 7,138,052 B2* | 11/2006 | Reid | B01D 35/303 | 285/376 |
| 7,147,772 B2* | 12/2006 | Fritze | B01D 35/153 | 210/450 |
| 7,163,237 B2* | 1/2007 | Niermeyer | B01D 35/26 | 285/124.1 |
| 7,163,618 B2* | 1/2007 | Beckham | B01D 35/153 | 210/473 |
| 7,172,693 B2* | 2/2007 | Reid | B01D 35/301 | 285/914 |
| 7,186,337 B2* | 3/2007 | Reid | B01D 35/303 | 285/376 |
| 7,232,517 B1* | 6/2007 | Shepherd | C02F 1/003 | 250/435 |
| 7,264,716 B2* | 9/2007 | Johnson | B01D 63/046 | 210/450 |
| 7,279,215 B2* | 10/2007 | Hester | B01D 63/0822 | 428/188 |
| 7,282,146 B2* | 10/2007 | Mannheim | B01D 65/003 | 210/232 |
| 7,296,582 B2* | 11/2007 | Campbell | B01D 61/20 | 210/257.2 |
| 7,300,582 B2* | 11/2007 | Pedersen | B01D 63/031 | 210/321.89 |
| 7,306,723 B2* | 12/2007 | Radford | C02F 1/003 | 141/330 |
| 7,306,727 B2* | 12/2007 | Perreault | B01D 63/089 | 210/488 |
| 7,326,325 B2* | 2/2008 | Liang | B01D 61/48 | 204/632 |
| 7,350,821 B2* | 4/2008 | Campbell | B01D 35/30 | 210/257.2 |
| 7,399,346 B2* | 7/2008 | van der Maas | B01D 53/0415 | 96/136 |
| 7,410,569 B1* | 8/2008 | Tilev | B01D 21/0012 | 210/411 |
| 7,413,668 B2* | 8/2008 | Reid | C02F 9/20 | 210/232 |
| 7,438,799 B2* | 10/2008 | Vandenbelt | C02F 1/003 | 210/138 |
| 7,469,932 B2* | 12/2008 | Niermeyer | F16L 39/00 | 285/124.1 |
| 7,476,315 B2* | 1/2009 | Reid | B01D 35/303 | 285/914 |
| 7,488,426 B1* | 2/2009 | Zaiter | B01D 29/54 | 210/345 |
| 7,497,340 B2* | 3/2009 | Hershberger | B09B 3/0075 | 210/136 |
| 7,513,993 B2* | 4/2009 | Goodwin | B01D 24/105 | 210/167.13 |
| 7,540,956 B1* | 6/2009 | Kurth | B01D 61/081 | 210/257.2 |
| 7,540,957 B1* | 6/2009 | Kurth | B01D 65/00 | 210/450 |
| 7,578,936 B2* | 8/2009 | Gaignet | B01D 65/00 | 210/232 |
| 7,601,256 B2* | 10/2009 | Beall | C02F 9/20 | 210/257.2 |
| 7,635,426 B2* | 12/2009 | Weinstein | B01D 63/084 | 210/231 |
| 7,651,070 B2* | 1/2010 | Ruprecht | B01D 35/30 | 210/420 |
| 7,662,283 B2* | 2/2010 | Eserkaln | C02F 9/20 | 210/232 |
| 7,695,619 B2* | 4/2010 | Kurth | C02F 9/20 | 210/232 |
| 7,699,989 B2* | 4/2010 | Grzonka | H02J 50/10 | 96/417 |
| 7,708,882 B2* | 5/2010 | Kobayashi | B01D 65/02 | 210/287 |
| 7,731,848 B2* | 6/2010 | Kim | B01D 63/026 | 210/321.89 |
| 7,736,503 B2* | 6/2010 | Kennedy | B01D 65/104 | 210/240 |
| 7,807,050 B2* | 10/2010 | Baumann | B01D 29/52 | 210/333.1 |
| 7,815,054 B2* | 10/2010 | Klein | B01D 29/114 | 210/418 |
| 7,833,424 B1* | 11/2010 | Baumann | B01D 29/688 | 210/791 |
| 7,862,719 B2* | 1/2011 | McMahon | B01D 65/08 | 210/240 |

(56) References Cited

U.S. PATENT DOCUMENTS

| | | | | |
|---|---|---|---|---|
| 7,871,527 B2* | 1/2011 | Smith | B01D 35/301 | 210/791 |
| 7,873,093 B2* | 1/2011 | van der Maas | H01S 3/036 | 55/505 |
| 7,901,570 B2* | 3/2011 | Grzonka | H02J 50/10 | 96/417 |
| 7,906,019 B2* | 3/2011 | Elliott | A01N 59/16 | 210/205 |
| 7,909,997 B2* | 3/2011 | Stoick | B01D 35/301 | 210/232 |
| 7,909,998 B2* | 3/2011 | Kennedy | B01D 65/104 | 210/240 |
| 7,918,999 B2* | 4/2011 | Gagnon | B01D 65/00 | 210/321.75 |
| 7,922,829 B2* | 4/2011 | Livingston | B08B 3/024 | 134/25.1 |
| 7,922,902 B2* | 4/2011 | Watari | C02F 3/1273 | 210/321.89 |
| 7,938,966 B2* | 5/2011 | Johnson | B01D 65/08 | 210/636 |
| 7,964,103 B2* | 6/2011 | Kennedy | B01D 35/301 | 210/651 |
| 7,976,705 B2* | 7/2011 | Gagnon | B01D 63/081 | 55/483 |
| 7,981,289 B2* | 7/2011 | Tadlock | B01D 35/303 | 210/348 |
| 7,981,290 B2* | 7/2011 | Baumann | B01D 29/688 | 210/333.1 |
| 8,029,672 B2* | 10/2011 | Baumann | F02M 37/42 | 55/318 |
| 8,043,502 B2* | 10/2011 | Nauta | C02F 1/003 | 210/473 |
| 8,048,319 B2* | 11/2011 | Smith | G21C 15/182 | 210/167.01 |
| 8,054,932 B2* | 11/2011 | Smith | C02F 1/001 | 210/167.01 |
| 8,075,773 B2* | 12/2011 | Watari | C02F 3/1273 | 210/321.89 |
| 8,088,291 B2* | 1/2012 | Hershberger | A61M 1/79 | 210/406 |
| 8,097,158 B2* | 1/2012 | Tubby | F16K 5/0414 | 251/149.6 |
| D656,580 S * | 3/2012 | Sherman | D23/209 | |
| 8,128,820 B2* | 3/2012 | Wu | C02F 1/003 | 210/260 |
| 8,177,966 B2* | 5/2012 | Wu | C02F 1/003 | 210/260 |
| 8,177,973 B2* | 5/2012 | Kennedy | B01D 65/104 | 210/240 |
| D663,828 S * | 7/2012 | Portillo | D23/371 | |
| 8,216,465 B2* | 7/2012 | Nauta | C02F 1/003 | 210/473 |
| 8,226,827 B2* | 7/2012 | Gagnon | B01D 63/081 | 210/359 |
| 8,241,495 B2* | 8/2012 | Aerts | C02F 1/444 | 210/321.89 |
| 8,241,502 B2* | 8/2012 | Watari | B01D 63/043 | 210/321.89 |
| 8,333,892 B2* | 12/2012 | Greene | B01D 63/02 | 210/321.89 |
| D673,647 S * | 1/2013 | Tandon | D23/209 | |
| D676,062 S * | 2/2013 | Flatley | B01D 35/30 | D15/5 |
| 8,372,273 B2* | 2/2013 | Joo | G01F 1/06 | 210/85 |
| 8,382,981 B2* | 2/2013 | Rogers | B01D 69/10 | 29/469 |
| 8,453,847 B2* | 6/2013 | Reif | B01D 65/003 | 210/488 |
| 8,454,822 B2* | 6/2013 | Morrissey | G01N 1/4005 | 73/866.5 |
| 8,561,809 B2* | 10/2013 | Tseng | B01D 29/96 | 210/232 |
| 8,574,431 B2* | 11/2013 | Lindsley | B01D 29/23 | 210/108 |
| 8,636,903 B2* | 1/2014 | Evanovich | B01D 35/303 | 210/240 |
| 8,636,904 B2* | 1/2014 | Watari | B01D 63/02 | 210/615 |
| 8,701,704 B2* | 4/2014 | Cirou | B01D 61/20 | 137/844 |
| 8,734,641 B2* | 5/2014 | Collins | B01D 29/661 | 210/411 |
| 8,771,509 B2* | 7/2014 | Huang | C02F 11/00 | 210/324 |
| 8,778,183 B2* | 7/2014 | Nakagawa | B01D 65/00 | 210/252 |
| 8,795,526 B2* | 8/2014 | Matsumoto | C02F 1/444 | 210/473 |
| 8,821,726 B2* | 9/2014 | Matsuzaki | B01D 63/0821 | 210/636 |
| 8,877,052 B2* | 11/2014 | Cirou | B23P 19/04 | 210/231 |
| 8,877,054 B2* | 11/2014 | Andersen | B01D 35/303 | 210/232 |
| 8,877,057 B2* | 11/2014 | Wessels | B01D 35/303 | 210/232 |
| 8,883,003 B2* | 11/2014 | Cirou | B01D 61/18 | 210/231 |
| 8,906,242 B2* | 12/2014 | McGuire | C02F 1/36 | 422/186 |
| 8,919,385 B2* | 12/2014 | Sayer | B01D 63/0822 | 137/561 A |
| 8,945,386 B2* | 2/2015 | Lee Wang | B01D 61/20 | 210/334 |
| 8,968,577 B2* | 3/2015 | McGuire | B01F 25/3121 | 422/186 |
| 8,999,154 B2* | 4/2015 | McGuire | C02F 9/00 | 422/186 |
| 9,005,441 B2* | 4/2015 | Kang | B01D 63/02 | 210/321.6 |
| 9,017,551 B2* | 4/2015 | Kennedy | C02F 3/1273 | 210/172.6 |
| 9,022,224 B2* | 5/2015 | Collignon | B01D 65/02 | 210/456 |
| 9,023,206 B2* | 5/2015 | Rogers | B01D 65/00 | 210/321.79 |
| 9,056,158 B2* | 6/2015 | Gavlak | A61M 1/79 | |
| 9,089,801 B1* | 7/2015 | Gavlak | A61M 1/79 | |
| 9,162,187 B2* | 10/2015 | Volker | B01D 63/00 | |
| 9,169,146 B2* | 10/2015 | McGuire | C02F 9/00 | |
| 9,193,605 B2* | 11/2015 | Minton-Edison | C02F 1/002 | |
| 9,216,388 B2* | 12/2015 | Hogstedt | B01D 65/00 | |
| 9,266,752 B2* | 2/2016 | McGuire | C02F 1/36 | |
| 9,289,703 B2* | 3/2016 | Morrissey | B01D 35/14 | |
| 9,314,743 B2* | 4/2016 | Kloos | B01D 61/025 | |
| 9,347,407 B2* | 5/2016 | Girondi | B01D 46/2414 | |
| D761,381 S * | 7/2016 | Natale | D23/209 | |
| D764,017 S * | 8/2016 | McMahon | D23/209 | |
| 9,446,336 B2* | 9/2016 | Huda | B01D 35/303 | |
| 9,446,970 B2* | 9/2016 | Sasakawa | C02F 1/444 | |
| 9,447,911 B2* | 9/2016 | Ohta | B01D 61/00 | |
| 9,468,872 B2* | 10/2016 | Laverdiere | B01D 65/00 | |
| 9,522,361 B2* | 12/2016 | Furuno | B01D 61/18 | |
| 9,527,021 B2* | 12/2016 | Gatica | B01D 46/4227 | |
| 9,573,092 B2* | 2/2017 | Pruneri | B01D 53/047 | |
| 9,573,230 B2* | 2/2017 | Cirou | B01D 25/164 | |
| 9,592,577 B2* | 3/2017 | Cirou | B01D 61/18 | |
| 9,604,166 B2* | 3/2017 | Biltoft | B01D 61/18 | |
| 9,630,127 B2* | 4/2017 | Hoots | B01D 29/27 | |
| 9,630,147 B2* | 4/2017 | Collignon | B01D 65/02 | |
| 9,656,192 B2* | 5/2017 | Voigt | B01D 63/00 | |
| 9,675,916 B2* | 6/2017 | Clements | B01D 35/12 | |
| 9,676,069 B2* | 6/2017 | Cirou | B23P 19/04 | |
| 9,718,028 B2* | 8/2017 | Ekstrom | B01D 63/0822 | |
| 9,718,714 B2* | 8/2017 | Ando | C02F 3/201 | |
| 9,744,485 B2* | 8/2017 | Burns | C02F 1/385 | |
| 9,757,670 B2* | 9/2017 | Lam | B01D 35/31 | |

(56) References Cited

U.S. PATENT DOCUMENTS

| | | | |
|---|---|---|---|
| 9,764,289 B2 * | 9/2017 | Swiatek | B01D 63/022 |
| 9,789,424 B2 * | 10/2017 | Reckin | B01D 27/08 |
| 9,795,723 B2 * | 10/2017 | Gavlak | A61M 1/78 |
| 9,795,904 B2 * | 10/2017 | Kang | B01D 65/00 |
| 9,802,142 B2 * | 10/2017 | Laverdiere | B25B 17/02 |
| 9,878,290 B2 * | 1/2018 | Matsuzaki | B01D 63/0822 |
| 9,889,239 B2 * | 2/2018 | Michaels | A61M 1/604 |
| 9,889,393 B2 * | 2/2018 | Nakagawa | C02F 1/44 |
| 9,925,499 B2 * | 3/2018 | Collignon | B01D 63/02 |
| 9,931,589 B2 * | 4/2018 | Tubby | B01D 27/108 |
| 9,931,647 B2 * | 4/2018 | Adey | F24D 19/0092 |
| 9,950,299 B2 * | 4/2018 | Borgerink | B01D 65/00 |
| 9,956,530 B2 * | 5/2018 | Johnson | C02F 3/006 |
| 9,975,068 B1 * | 5/2018 | Maresh | B01D 24/00 |
| 10,016,703 B2 * | 7/2018 | Dong | B01D 27/142 |
| 10,040,701 B2 * | 8/2018 | Masutani | C02F 1/44 |
| D831,787 S * | 10/2018 | Luo | D23/209 |
| 10,112,147 B2 * | 10/2018 | Yanone | C02F 1/44 |
| 10,130,915 B2 * | 11/2018 | Berrada | B01D 69/04 |
| 10,245,536 B2 * | 4/2019 | Dunsch | B01D 35/005 |
| 10,307,712 B2 * | 6/2019 | Huda | B01D 15/361 |
| 10,322,375 B2 * | 6/2019 | Swiatek | B01D 61/20 |
| 10,350,525 B2 * | 7/2019 | Ritzka | C02F 1/283 |
| 10,391,432 B2 * | 8/2019 | Biltoft | B01D 61/18 |
| 10,421,032 B2 * | 9/2019 | Foix | C02F 9/20 |
| 10,427,102 B2 * | 10/2019 | Cao | B01D 65/108 |
| 10,427,105 B2 * | 10/2019 | Blanke | B01D 65/003 |
| 10,464,022 B2 * | 11/2019 | Beall | B01D 61/22 |
| 10,471,188 B1 * | 11/2019 | Zollinger | B09B 3/0075 |
| 10,500,529 B2 * | 12/2019 | Sellers | B01D 29/56 |
| 10,549,239 B2 * | 2/2020 | Hirsch | C02F 1/008 |
| 10,550,742 B2 * | 2/2020 | Zuerker | B01D 46/58 |
| 10,583,399 B2 * | 3/2020 | Holger | B01D 65/00 |
| 10,589,195 B2 * | 3/2020 | Han | C02F 1/004 |
| 10,589,199 B2 * | 3/2020 | See | C02F 1/444 |
| 10,589,200 B1 * | 3/2020 | Maresh | C02F 1/001 |
| 10,603,416 B1 * | 3/2020 | Zollinger | B09B 3/0075 |
| 10,618,010 B2 * | 4/2020 | Ajam | B01D 65/00 |
| 10,647,592 B2 * | 5/2020 | Geelhood | C02F 1/002 |
| 10,654,736 B2 * | 5/2020 | Foster | C02F 9/20 |
| 10,717,046 B2 * | 7/2020 | Adams | B01D 61/025 |
| 10,800,666 B2 * | 10/2020 | Hsing | B01D 35/303 |
| 10,843,127 B2 * | 11/2020 | Reese | B01D 69/02 |
| 10,905,976 B2 * | 2/2021 | Johnson | B01D 21/0012 |
| 10,913,017 B2 * | 2/2021 | Singh | C02F 1/444 |
| 10,933,176 B2 * | 3/2021 | Gavlak | A61M 1/78 |
| 10,933,353 B2 * | 3/2021 | Saul | B01D 24/12 |
| 10,933,379 B2 * | 3/2021 | Han | B01D 63/0821 |
| 10,960,114 B2 * | 3/2021 | Goisis | A61M 1/029 |
| 10,960,328 B2 * | 3/2021 | Wade | B01D 21/0012 |
| 10,987,615 B2 * | 4/2021 | Sun | B01D 29/96 |
| 11,001,415 B1 * | 5/2021 | Kotoff, Jr. | E04H 4/14 |
| 11,020,695 B2 * | 6/2021 | Meza | F04B 53/22 |
| 11,041,787 B2 * | 6/2021 | Kawara | B01D 29/56 |
| 11,065,569 B2 * | 7/2021 | Biltoft | B01D 61/18 |
| 11,077,392 B2 * | 8/2021 | Foix | B01D 61/08 |
| 11,083,998 B2 * | 8/2021 | Abu-Ghdaib | B01D 65/08 |
| 11,110,376 B1 * | 9/2021 | Maresh | C02F 1/003 |
| 11,141,699 B2 * | 10/2021 | Lim | B01D 65/02 |
| 11,161,062 B2 * | 11/2021 | Johnson | C02F 9/20 |
| 11,161,078 B2 * | 11/2021 | Loewe | B01D 35/303 |
| 11,173,430 B2 * | 11/2021 | Gaudfrin | B01D 29/395 |
| 11,173,453 B2 * | 11/2021 | Cao | B01D 65/108 |
| 11,185,822 B2 * | 11/2021 | Hirsch | B01D 35/1435 |
| 11,202,975 B2 * | 12/2021 | Han | C02F 1/004 |
| 11,207,622 B2 * | 12/2021 | Völker | B01D 69/08 |
| 11,234,787 B1 * | 2/2022 | Staats | G06F 21/6245 |
| 11,247,153 B2 * | 2/2022 | Han | C02F 1/44 |
| 11,285,410 B2 * | 3/2022 | Schaefer | B01D 29/52 |
| 11,285,413 B2 * | 3/2022 | Sun | B01D 35/30 |
| 11,305,238 B2 * | 4/2022 | Beall | B01D 65/102 |
| 11,318,481 B2 * | 5/2022 | Glaves | B04C 5/02 |
| 11,333,264 B2 * | 5/2022 | Schmitt | F16K 37/005 |
| 11,339,768 B2 * | 5/2022 | Meza | C02F 1/003 |
| 11,358,076 B2 * | 6/2022 | Kashiyama | B01D 35/02 |
| 11,361,870 B2 * | 6/2022 | Rhodes | G21D 1/02 |
| 11,369,923 B2 * | 6/2022 | Adams | B01D 15/361 |
| 11,433,354 B2 * | 9/2022 | Lee | C02F 1/441 |
| 11,458,241 B2 * | 10/2022 | Smith | B01D 46/0097 |
| 11,471,833 B2 * | 10/2022 | Han | B01D 69/1071 |
| 11,492,273 B2 * | 11/2022 | Auman | C02F 1/444 |
| 11,534,704 B2 * | 12/2022 | Reckin | B01D 27/08 |
| 11,554,337 B2 * | 1/2023 | Surdick | B01D 25/02 |
| 11,607,648 B2 * | 3/2023 | An | H01M 8/04149 |
| 11,633,697 B2 * | 4/2023 | Wortmeyer | B01D 61/16 210/636 |
| 11,638,890 B2 * | 5/2023 | Wade | B01D 35/303 210/806 |
| 11,660,565 B2 * | 5/2023 | Reese | B01D 63/04 95/45 |
| 11,707,716 B2 * | 7/2023 | Noguchi | C02F 1/44 210/321.84 |
| 11,745,127 B2 * | 9/2023 | Schmitt | F16K 37/0008 137/553 |
| 11,779,866 B2 * | 10/2023 | Gregerson | B01D 35/306 210/253 |
| 11,794,135 B2 * | 10/2023 | Loewe | B01D 29/56 |
| 11,807,561 B2 * | 11/2023 | Hodges | B01D 39/083 |
| 11,813,570 B2 * | 11/2023 | Adams | B01D 61/029 |
| 11,826,678 B2 * | 11/2023 | Saul | B01D 24/24 |
| 11,826,683 B2 * | 11/2023 | Foix | B01D 61/08 |
| 11,872,506 B2 * | 1/2024 | Weitz | B01D 24/38 |
| 11,904,280 B2 * | 2/2024 | Heijnen | B01D 63/04 |
| 11,925,489 B1 * | 3/2024 | Staats | G06F 21/44 |
| 11,938,424 B2 * | 3/2024 | Han | C02F 1/003 |
| D1,022,151 S * | 4/2024 | Dumonceaux | D23/263 |
| D1,023,251 S * | 4/2024 | Dumonceaux | D23/263 |
| 11,944,928 B2 * | 4/2024 | Thomas | B01D 46/0004 |
| 11,964,236 B2 * | 4/2024 | Noekleby | B01D 61/18 |
| 11,969,688 B2 * | 4/2024 | Thom | B01D 24/002 |
| D1,032,777 S * | 6/2024 | Ormond | D23/207 |
| 12,005,171 B2 * | 6/2024 | Jones | A61M 1/88 |
| D1,033,591 S * | 7/2024 | Ormond | D23/207 |
| 12,053,742 B2 * | 8/2024 | Hirsch | B01D 61/029 |
| 12,070,704 B2 * | 8/2024 | Wade | B01D 29/13 |
| 12,129,458 B2 * | 10/2024 | Manzke | C12M 29/04 |
| 12,162,743 B2 * | 12/2024 | Park | C02F 1/003 |
| 12,172,108 B2 * | 12/2024 | Susienka | B01D 27/14 |
| 12,186,743 B2 * | 1/2025 | Watkins | B01L 3/0293 |
| 12,194,395 B1 * | 1/2025 | Melkonian | B01D 29/50 |
| 12,215,555 B2 * | 2/2025 | John | B01D 37/046 |
| 12,246,272 B2 * | 3/2025 | Collins | B01D 29/05 |
| 12,251,665 B2 * | 3/2025 | Kim | B01D 63/046 |
| 12,263,449 B2 * | 4/2025 | Connors, Jr. | B01D 63/0822 |
| 2001/0027951 A1 * | 10/2001 | Gungerich | C02F 1/444 210/321.89 |
| 2002/0070159 A1 * | 6/2002 | Reedy | B01D 29/72 210/486 |
| 2002/0079695 A1 * | 6/2002 | Campbell | B01D 35/30 285/26 |
| 2002/0092813 A1 * | 7/2002 | Radford | C02F 1/003 210/473 |
| 2002/0104794 A1 * | 8/2002 | Hoffmann | B01D 35/30 210/323.2 |
| 2002/0113022 A1 * | 8/2002 | Gadgil | B01D 39/2068 210/748.11 |
| 2002/0125183 A1 * | 9/2002 | Chaney | B01D 35/157 210/418 |
| 2002/0125187 A1 * | 9/2002 | Tanner | C02F 1/003 210/477 |
| 2002/0148767 A1 * | 10/2002 | Johnson | B01D 63/046 210/321.6 |
| 2002/0153299 A1 * | 10/2002 | Mahendran | B01D 65/08 210/321.89 |
| 2002/0179517 A1 * | 12/2002 | Pedersen | B01D 65/08 210/321.89 |
| 2002/0185421 A1 * | 12/2002 | Quintel | B01D 29/52 210/153 |
| 2003/0019805 A1 * | 1/2003 | Fritze | C02F 1/003 210/232 |
| 2003/0075504 A1 * | 4/2003 | Zha | C02F 3/1273 210/636 |

(56) References Cited

U.S. PATENT DOCUMENTS

| | | | |
|---|---|---|---|
| 2003/0102257 A1* | 6/2003 | Reid | B01D 46/88 210/232 |
| 2003/0121840 A1* | 7/2003 | Pex | B01D 61/362 210/321.81 |
| 2003/0121855 A1* | 7/2003 | Kopp | B01D 65/08 210/791 |
| 2003/0136746 A1* | 7/2003 | Behmann | B01D 65/02 210/771 |
| 2003/0141248 A1* | 7/2003 | Mahendran | C02F 3/1273 210/321.89 |
| 2003/0164342 A1* | 9/2003 | Mason | B01D 29/114 210/323.2 |
| 2003/0168394 A1* | 9/2003 | Gill | C02F 9/20 210/443 |
| 2003/0173286 A1* | 9/2003 | Evanovich | B01D 35/303 210/90 |
| 2003/0213733 A1* | 11/2003 | Beckham | A61M 1/79 210/500.1 |
| 2003/0217958 A1* | 11/2003 | Reid | B01D 35/301 210/232 |
| 2003/0217959 A1* | 11/2003 | Fritze | C02F 1/003 210/232 |
| 2004/0070200 A1* | 4/2004 | Campbell | B01D 35/30 285/124.1 |
| 2004/0070201 A1* | 4/2004 | Niermeyer | B01D 65/00 285/124.1 |
| 2004/0104157 A1* | 6/2004 | Beeman | C02F 9/20 210/232 |
| 2004/0104161 A1* | 6/2004 | Gaignet | B01D 61/10 210/323.2 |
| 2004/0124158 A1* | 7/2004 | Smith | B01D 35/301 210/791 |
| 2004/0134932 A1* | 7/2004 | Lobdell | B67D 3/0029 222/189.06 |
| 2004/0188339 A1* | 9/2004 | Murkute | B01D 61/18 210/321.79 |
| 2004/0189002 A1* | 9/2004 | Niemeyer | B01D 35/26 285/124.1 |
| 2004/0206683 A1* | 10/2004 | Cote | B01D 63/043 210/321.89 |
| 2004/0231517 A1* | 11/2004 | van der Maas | G01N 1/4077 55/420 |
| 2004/0238423 A1* | 12/2004 | Schmitt | B01D 61/10 210/257.2 |
| 2004/0238431 A1* | 12/2004 | Johnson | B01D 65/00 210/321.89 |
| 2004/0251192 A1* | 12/2004 | Fritze | B01D 61/20 210/232 |
| 2005/0011822 A1* | 1/2005 | Reid | B01D 46/009 210/232 |
| 2005/0023219 A1* | 2/2005 | Kirker | B01D 63/0822 210/636 |
| 2005/0045552 A1* | 3/2005 | Tadlock | B01D 35/303 210/450 |
| 2005/0072729 A1* | 4/2005 | Bridges | C02F 1/50 210/450 |
| 2005/0087446 A1* | 4/2005 | Liang | B01D 61/48 204/632 |
| 2005/0092665 A1* | 5/2005 | Kirchner | B01D 35/1576 210/123 |
| 2005/0098506 A1* | 5/2005 | Bridges | C02F 1/50 210/753 |
| 2005/0115911 A1* | 6/2005 | Smith | B01D 29/684 210/791 |
| 2005/0123727 A1* | 6/2005 | Hester | B01D 63/0822 428/188 |
| 2005/0126985 A1* | 6/2005 | Campbell | B01D 36/001 210/232 |
| 2005/0133435 A1* | 6/2005 | Campbell | B01D 61/20 210/321.6 |
| 2005/0133463 A1* | 6/2005 | Kirchner | B01D 35/153 210/418 |
| 2005/0167352 A1* | 8/2005 | Burrows | C02F 9/20 210/241 |
| 2005/0173317 A1* | 8/2005 | Schmitt | B01D 61/10 210/450 |
| 2005/0178711 A1* | 8/2005 | Reid | B01D 35/303 210/232 |
| 2005/0189288 A1* | 9/2005 | Hershberger | B09B 3/0075 210/473 |
| 2005/0223901 A1* | 10/2005 | van der Maas | B01D 53/0415 96/117.5 |
| 2006/0000754 A1* | 1/2006 | Kang | B01D 35/301 210/97 |
| 2006/0021929 A1* | 2/2006 | Mannheim | B01D 61/20 210/232 |
| 2006/0032202 A1* | 2/2006 | Reid | B01D 35/301 55/498 |
| 2006/0102546 A1* | 5/2006 | Gaignet | B01D 61/18 210/232 |
| 2006/0113240 A1* | 6/2006 | Burrows | B01D 35/301 210/136 |
| 2006/0113258 A1* | 6/2006 | Radford | C02F 1/003 210/232 |
| 2006/0118477 A1* | 6/2006 | Pedersen | C02F 1/444 210/321.89 |
| 2006/0144781 A1* | 7/2006 | Carlson | B01D 61/20 210/473 |
| 2006/0163141 A1* | 7/2006 | Weinstein | B01D 63/084 210/321.75 |
| 2006/0163142 A1* | 7/2006 | Nonninger | B01D 29/39 210/299 |
| 2006/0186032 A1* | 8/2006 | Camilli | B01D 61/08 210/321.83 |
| 2006/0213825 A1* | 9/2006 | Averbeck | C02F 9/20 210/254 |
| 2006/0254971 A1* | 11/2006 | Tubby | B01D 27/08 210/235 |
| 2006/0272995 A1* | 12/2006 | Fritze | C02F 1/003 210/234 |
| 2007/0017856 A1* | 1/2007 | Lin | B01D 63/069 210/85 |
| 2007/0039889 A1* | 2/2007 | Ashford | B01D 61/02 210/321.89 |
| 2007/0045166 A1* | 3/2007 | Fanning | F16L 27/113 210/488 |
| 2007/0080118 A1* | 4/2007 | Lindsley | B01D 35/0276 210/791 |
| 2007/0084782 A1* | 4/2007 | Smith | B01D 29/15 210/323.2 |
| 2007/0102339 A1* | 5/2007 | Cote | B01D 61/18 210/636 |
| 2007/0131602 A1* | 6/2007 | Reid | C02F 9/20 210/232 |
| 2007/0151916 A1* | 7/2007 | Knappe | B01D 61/18 210/321.74 |
| 2007/0181484 A1* | 8/2007 | Reckin | C02F 9/20 210/321.72 |
| 2007/0215535 A1* | 9/2007 | Reid | B01D 46/0005 210/232 |
| 2007/0221583 A1* | 9/2007 | Ruprecht | B01D 35/30 210/767 |
| 2008/0067127 A1* | 3/2008 | Morikawa | B01D 63/10 210/231 |
| 2008/0093279 A1* | 4/2008 | Baumann | F02M 37/0029 210/137 |
| 2008/0105605 A1* | 5/2008 | Kobayashi | C02F 1/444 210/287 |
| 2008/0110504 A1* | 5/2008 | Johnson | B01D 63/00 137/266 |
| 2008/0135468 A1* | 6/2008 | Gagnon | B01D 65/00 55/483 |
| 2008/0135500 A1* | 6/2008 | Gagnon | B01D 63/082 210/321.75 |
| 2008/0178735 A1* | 7/2008 | Barnette | B01D 63/02 95/45 |
| 2008/0185323 A1* | 8/2008 | Kargenian | B01D 69/10 210/323.1 |

(56) References Cited

U.S. PATENT DOCUMENTS

| | | | |
|---|---|---|---|
| 2008/0203033 A1* | 8/2008 | Gregory | B01D 65/104 210/240 |
| 2008/0217252 A1* | 9/2008 | Elliott | A01N 59/16 210/661 |
| 2009/0159535 A1* | 6/2009 | Hershberger | A61M 1/79 210/741 |
| 2009/0184064 A1* | 7/2009 | Zaiter | B01D 29/54 210/170.01 |
| 2009/0236271 A1* | 9/2009 | Eserkaln | C02F 9/20 210/137 |
| 2009/0236276 A1* | 9/2009 | Kurth | C02F 9/20 210/232 |
| 2009/0236277 A1* | 9/2009 | Kurth | C02F 9/20 210/234 |
| 2009/0236295 A1* | 9/2009 | Braun | B01D 63/0822 210/450 |
| 2009/0236298 A1* | 9/2009 | Lindsley | B01D 29/902 210/411 |
| 2009/0283532 A1* | 11/2009 | Pellin | B01D 27/08 220/592.01 |
| 2009/0314706 A1* | 12/2009 | Kim | B01D 65/025 210/462 |
| 2010/0000929 A1* | 1/2010 | Gaignet | B01D 61/10 210/232 |
| 2010/0000935 A1* | 1/2010 | Sakai | C02F 3/1273 210/455 |
| 2010/0025315 A1* | 2/2010 | Smith | B01D 29/15 210/232 |
| 2010/0065487 A1* | 3/2010 | Jang | B01D 63/0822 210/321.72 |
| 2010/0096317 A1* | 4/2010 | Morita | B01D 63/081 210/321.84 |
| 2010/0191497 A1* | 7/2010 | Kennedy | B01D 61/12 210/651 |
| 2010/0237000 A1* | 9/2010 | Stoick | B01D 35/301 210/232 |
| 2010/0237001 A1* | 9/2010 | Kennedy | B01D 65/104 210/240 |
| 2010/0243551 A1* | 9/2010 | Ruprecht | B01D 35/303 210/235 |
| 2010/0252501 A1* | 10/2010 | Greene | B01D 63/02 210/232 |
| 2010/0307965 A1* | 12/2010 | Volker | B01D 65/00 210/232 |
| 2011/0005987 A1* | 1/2011 | Matsuzaki | B01D 63/0821 210/232 |
| 2011/0049034 A1* | 3/2011 | Theron | B01D 63/12 210/232 |
| 2011/0049037 A1* | 3/2011 | Masutani | B01D 61/18 210/257.2 |
| 2011/0120960 A1* | 5/2011 | Smith | B01D 29/684 210/791 |
| 2011/0127209 A1* | 6/2011 | Rogers | B01D 61/18 29/469 |
| 2011/0147298 A1* | 6/2011 | Kennedy | B01D 65/104 210/240 |
| 2011/0186526 A1* | 8/2011 | McGuire | C02F 9/00 210/198.1 |
| 2011/0203986 A1* | 8/2011 | Gagnon | B01D 63/081 210/542 |
| 2011/0204092 A1* | 8/2011 | Niermeyer | B01D 35/26 137/1 |
| 2011/0210070 A1* | 9/2011 | Watari | B01D 63/02 210/321.89 |
| 2011/0215059 A1* | 9/2011 | Smith | B01D 29/58 210/232 |
| 2011/0220559 A1* | 9/2011 | Joo | G01F 1/07 210/85 |
| 2012/0012514 A1* | 1/2012 | Sasakawa | C02F 1/444 210/348 |
| 2012/0055858 A1* | 3/2012 | Collins | B01D 29/39 210/121 |
| 2012/0067809 A1* | 3/2012 | Nakagawa | B01D 29/39 210/346 |
| 2012/0074053 A1* | 3/2012 | Collignon | B01D 63/046 210/209 |
| 2012/0080369 A1* | 4/2012 | Tubby | B01D 27/108 210/235 |
| 2012/0125839 A1* | 5/2012 | Watari | C02F 3/1273 210/615 |
| 2012/0174996 A1* | 7/2012 | Cirou | B01D 61/20 137/544 |
| 2012/0205301 A1* | 8/2012 | McGuire | C02F 1/36 210/151 |
| 2012/0211412 A1* | 8/2012 | Tubby | F16K 5/0414 210/443 |
| 2012/0248025 A1* | 10/2012 | Reinbigler | C12M 23/44 210/241 |
| 2012/0255915 A1* | 10/2012 | Linster | B01D 29/665 210/323.1 |
| 2012/0267314 A1* | 10/2012 | Minton-Edison | C02F 1/44 210/695 |
| 2012/0267326 A1* | 10/2012 | Borgerink | B01D 65/00 210/232 |
| 2012/0273433 A1* | 11/2012 | Wessels | B01D 35/303 210/232 |
| 2012/0292318 A1* | 11/2012 | Kennedy | B01D 61/20 220/200 |
| 2013/0062266 A1* | 3/2013 | Horner | C02F 1/001 137/15.01 |
| 2013/0075322 A1* | 3/2013 | Lee Wang | B01D 61/20 210/332 |
| 2013/0118966 A1* | 5/2013 | Furuno | C02F 3/1273 210/232 |
| 2013/0168307 A1* | 7/2013 | Drivarbekk | B01D 61/18 210/321.78 |
| 2013/0186817 A1* | 7/2013 | Rogers | B01D 61/18 210/321.72 |
| 2013/0221546 A1* | 8/2013 | Christ | B01D 63/0821 210/231 |
| 2013/0248456 A1* | 9/2013 | McGuire | C02F 9/00 210/721 |
| 2013/0256236 A1* | 10/2013 | Huang | C02F 11/121 210/411 |
| 2013/0270171 A1* | 10/2013 | Ben-Horin | B01D 29/54 210/345 |
| 2013/0327720 A1* | 12/2013 | McGuire | B01F 33/5021 210/748.03 |
| 2014/0027369 A1* | 1/2014 | Saul | B01D 24/22 210/293 |
| 2014/0048466 A1* | 2/2014 | McGuire | C02F 1/36 210/170.09 |
| 2014/0091027 A1* | 4/2014 | Laverdiere | F16L 19/0225 29/428 |
| 2014/0097143 A1* | 4/2014 | Clements | B01D 29/668 210/791 |
| 2014/0131269 A1* | 5/2014 | Greene | B01D 63/034 210/323.2 |
| 2014/0174998 A1* | 6/2014 | Aerts | B01D 63/043 210/151 |
| 2014/0197091 A1* | 7/2014 | Andersen | B01D 35/303 210/323.2 |
| 2014/0230384 A1* | 8/2014 | Girondi | B01D 46/58 55/419 |
| 2014/0231367 A1* | 8/2014 | Biltoft | B01D 35/34 210/454 |
| 2014/0263027 A1* | 9/2014 | Schmitt | B01D 35/303 210/323.1 |
| 2014/0305860 A1* | 10/2014 | Ekstrom | B01D 63/0822 408/1 R |
| 2015/0008173 A1* | 1/2015 | Lee | B01D 27/08 210/236 |
| 2015/0068966 A1* | 3/2015 | Tubby | B01D 27/08 210/232 |
| 2015/0068970 A1* | 3/2015 | Cho | B01D 63/12 210/323.1 |
| 2015/0108050 A1* | 4/2015 | Maggiore | B01D 35/303 210/85 |

(56) References Cited

U.S. PATENT DOCUMENTS

| | | | |
|---|---|---|---|
| 2015/0113925 A1* | 4/2015 | Gatica | B01D 46/4227 55/357 |
| 2015/0114896 A1* | 4/2015 | Lam | B01D 35/30 210/236 |
| 2015/0122715 A1* | 5/2015 | Collignon | B01D 63/046 137/13 |
| 2015/0129478 A1* | 5/2015 | Lam | B01D 35/31 210/232 |
| 2015/0144545 A1* | 5/2015 | Kang | B01D 35/14 210/232 |
| 2015/0151222 A1* | 6/2015 | Simmons | B01D 29/52 210/323.2 |
| 2015/0209700 A1* | 7/2015 | Voigt | B01D 63/08 210/489 |
| 2015/0252934 A1* | 9/2015 | Ohta | F16L 3/221 210/323.1 |
| 2015/0273365 A1* | 10/2015 | Laverdiere | B01D 63/14 285/124.5 |
| 2015/0291454 A1* | 10/2015 | McGuire | C02F 1/78 210/209 |
| 2015/0329381 A1* | 11/2015 | Kitanaka | C02F 1/44 210/322 |
| 2015/0344337 A1* | 12/2015 | Ando | C02F 3/201 210/322 |
| 2016/0030888 A1* | 2/2016 | Diemer | B01D 63/0822 210/433.1 |
| 2016/0101381 A1* | 4/2016 | Abbott | B01D 46/0056 55/383 |
| 2016/0114271 A1* | 4/2016 | Michaud | C02F 1/003 210/807 |
| 2016/0144301 A1* | 5/2016 | Tadlock | B01D 35/303 210/236 |
| 2016/0152932 A1* | 6/2016 | Herb | B01D 63/046 210/321.89 |
| 2016/0153411 A1* | 6/2016 | Underwood | B01D 35/306 248/213.2 |
| 2016/0206977 A9* | 7/2016 | Greene | C02F 1/001 |
| 2016/0207005 A1* | 7/2016 | Berrada | B01D 63/12 |
| 2016/0236119 A1* | 8/2016 | Tubby | B01D 27/106 |
| 2017/0028319 A1* | 2/2017 | Dong | B01D 27/142 |
| 2017/0029294 A1* | 2/2017 | Carlotto | B01D 61/145 |
| 2017/0037821 A1* | 2/2017 | Paulson | F02M 37/40 |
| 2017/0136412 A1* | 5/2017 | Huda | B01D 61/12 |
| 2017/0137303 A1* | 5/2017 | Hirsch | C02F 1/008 |
| 2017/0137304 A1* | 5/2017 | Adams | B01D 61/04 |
| 2017/0151533 A1* | 6/2017 | Biltoft | B01D 35/34 |
| 2017/0212022 A1* | 7/2017 | Kawara | B01D 29/0093 |
| 2017/0252678 A1* | 9/2017 | Tubby | B01D 27/108 |
| 2017/0259196 A1* | 9/2017 | Foix | B01D 61/08 |
| 2017/0271732 A1* | 9/2017 | Rossiter | H01P 3/08 |
| 2017/0312665 A1* | 11/2017 | Ritzka | C02F 1/283 |
| 2018/0021731 A1* | 1/2018 | Knappe | B01D 65/00 210/321.6 |
| 2018/0078885 A1* | 3/2018 | Baskaran | F01M 11/03 |
| 2018/0154290 A1* | 6/2018 | See | C02F 1/002 |
| 2018/0272257 A1* | 9/2018 | Kashiyama | H01L 21/67023 |
| 2018/0280838 A1* | 10/2018 | Johnson | B01D 21/307 |
| 2018/0280885 A1* | 10/2018 | Yanone | C02F 1/44 |
| 2018/0339247 A1* | 11/2018 | Han | C02F 1/44 210/483 |
| 2018/0361322 A1* | 12/2018 | Ajam | B01D 63/0822 |
| 2019/0010071 A1* | 1/2019 | Reijer Picozzi | C02F 11/121 |
| 2019/0022593 A1* | 1/2019 | Messier | B01D 63/0822 |
| 2019/0047889 A1* | 2/2019 | Foster | C02F 9/20 |
| 2019/0060788 A1* | 2/2019 | Hampton | B01D 29/13 |
| 2019/0083910 A1* | 3/2019 | Schaefer | B01D 29/56 |
| 2019/0083936 A1* | 3/2019 | Loewe | B01D 46/0005 |
| 2019/0143263 A1* | 5/2019 | Reese | B01D 53/226 95/45 |
| 2019/0144298 A1* | 5/2019 | Chen | C02F 1/003 210/266 |
| 2019/0209972 A1* | 7/2019 | Han | B01D 63/0821 |
| 2019/0247772 A1* | 8/2019 | Han | B01D 69/06 |
| 2019/0275450 A1* | 9/2019 | Singh | B01D 35/143 |
| 2019/0282938 A1* | 9/2019 | Foix | B01D 61/08 |
| 2019/0291032 A1* | 9/2019 | Baird | B01D 35/30 |
| 2019/0374888 A1* | 12/2019 | Biltoft | B01D 35/34 |
| 2020/0016542 A1* | 1/2020 | Han | B01D 69/06 |
| 2020/0071189 A1* | 3/2020 | Geelhood | C02F 1/283 |
| 2020/0078716 A1* | 3/2020 | Völker | B01D 35/306 |
| 2020/0094192 A1* | 3/2020 | Strikovski | B01D 61/027 |
| 2020/0101421 A1* | 4/2020 | Abu-Ghdaib | B01D 63/14 |
| 2020/0139286 A1* | 5/2020 | Surdick | B01D 35/306 |
| 2020/0147549 A1* | 5/2020 | Hirsch | B01D 61/025 |
| 2020/0164289 A1* | 5/2020 | Friese | B01D 63/06 |
| 2020/0171413 A1* | 6/2020 | Han | C02F 1/004 |
| 2020/0179837 A1* | 6/2020 | Loewe | C12M 33/14 |
| 2020/0179878 A1* | 6/2020 | Lim | B01D 65/02 |
| 2020/0215463 A1* | 7/2020 | Johnson | B01D 35/027 |
| 2020/0246735 A1* | 8/2020 | Foster | B01D 29/52 |
| 2020/0256478 A1* | 8/2020 | Schmitt | B01D 35/143 |
| 2020/0282349 A1* | 9/2020 | Sutherland | B01D 27/08 |
| 2020/0330927 A1* | 10/2020 | An | H01M 8/1058 |
| 2020/0377377 A1* | 12/2020 | Patera | C02F 5/14 |
| 2020/0384413 A1* | 12/2020 | Adams | C02F 5/00 |
| 2021/0008470 A1* | 1/2021 | Hodges | B01D 29/52 |
| 2021/0008498 A1* | 1/2021 | Wortmeyer | B01D 61/18 |
| 2021/0023500 A1* | 1/2021 | Reese | B01D 53/227 |
| 2021/0024382 A1* | 1/2021 | Tally | B01D 61/08 |
| 2021/0060465 A1* | 3/2021 | Wallace | B01D 17/10 |
| 2021/0129082 A1* | 5/2021 | Veerman | B01D 61/50 |
| 2021/0213388 A1* | 7/2021 | Heijnen | B01D 61/18 |
| 2021/0299602 A1* | 9/2021 | Thomas | B01D 46/003 |
| 2021/0308607 A1* | 10/2021 | Foix | B01D 61/08 |
| 2021/0316251 A1* | 10/2021 | Lee | B01D 61/10 |
| 2021/0322901 A1* | 10/2021 | Susienka | B01D 27/148 |
| 2021/0331104 A1* | 10/2021 | Gregerson | B01D 35/306 |
| 2021/0354056 A1* | 11/2021 | Dehn | B01D 29/52 |
| 2021/0354057 A1* | 11/2021 | Saul | B01D 24/24 |
| 2021/0369934 A1* | 12/2021 | Jones | A61M 1/88 |
| 2021/0379512 A1* | 12/2021 | Sun | B01D 35/30 |
| 2022/0002654 A1* | 1/2022 | Jang | C12M 23/48 |
| 2022/0008910 A1* | 1/2022 | Watkins | F16J 15/106 |
| 2022/0040640 A1* | 2/2022 | Hirsch | C02F 1/008 |
| 2022/0047975 A1* | 2/2022 | Johnson | B01D 29/58 |
| 2022/0054958 A1* | 2/2022 | Han | B01D 36/001 |
| 2022/0062798 A1* | 3/2022 | Auman | B01D 29/52 |
| 2022/0088512 A1* | 3/2022 | Zeiler | B01D 61/18 |
| 2022/0097005 A1* | 3/2022 | Noekleby | B01D 63/12 |
| 2022/0135444 A1* | 5/2022 | Auman | B01D 61/147 |
| 2022/0154841 A1* | 5/2022 | Schmitt | B01D 35/143 |
| 2022/0185652 A1* | 6/2022 | Park | B67D 1/0014 |
| 2022/0266179 A1* | 8/2022 | Yadav | F16L 41/03 |
| 2022/0266199 A1* | 8/2022 | Syron | B01D 63/043 |
| 2022/0280898 A1* | 9/2022 | Adams | B01D 61/025 |
| 2022/0288537 A1* | 9/2022 | Kim | B01D 63/046 |
| 2022/0356095 A1* | 11/2022 | Lee | B01D 63/0622 |
| 2022/0362715 A1* | 11/2022 | Amaduzzi | C02F 9/20 |
| 2022/0395782 A1* | 12/2022 | Connors, Jr. | B01D 63/081 |
| 2023/0092095 A1* | 3/2023 | Kozono | B01D 65/02 210/636 |
| 2023/0105431 A1* | 4/2023 | Dehn | B01D 24/14 210/345 |
| 2023/0125105 A1* | 4/2023 | Noguchi | B01D 61/20 210/321.84 |
| 2023/0136410 A1* | 5/2023 | Collins | B01D 29/05 210/435 |
| 2023/0138197 A1* | 5/2023 | Torres | B01D 69/06 210/483 |
| 2023/0166203 A1* | 6/2023 | Song | C02F 1/001 210/455 |
| 2023/0302409 A1* | 9/2023 | Lee | B01D 63/084 |
| 2023/0372844 A1* | 11/2023 | Handt | B01D 35/1475 |
| 2024/0042355 A1* | 2/2024 | Foix | B01D 61/08 |
| 2024/0059586 A1* | 2/2024 | Becher | C02F 1/265 |
| 2024/0066450 A1* | 2/2024 | Lee | B01D 29/00 |
| 2024/0082761 A1* | 3/2024 | Wallace | B01D 35/306 |
| 2024/0091686 A1* | 3/2024 | Kim | B01D 29/50 |
| 2024/0207767 A1* | 6/2024 | Thomas | B01D 35/303 |
| 2024/0261732 A1* | 8/2024 | Volmering | C02F 3/1273 |
| 2024/0285840 A1* | 8/2024 | Jones | A61M 1/88 |
| 2024/0325980 A1* | 10/2024 | Nakashima | B01D 63/046 |

(56) References Cited

U.S. PATENT DOCUMENTS

| | | | | |
|---|---|---|---|---|
| 2024/0390823 A1* | 11/2024 | Duby | ................. | B01D 25/32 |
| 2025/0001364 A1* | 1/2025 | Friese | ................. | B01D 27/146 |
| 2025/0041791 A1* | 2/2025 | Furusawa | ............ | B01D 53/226 |

FOREIGN PATENT DOCUMENTS

| | | | |
|---|---|---|---|
| KR | 100459037 A | 12/2004 |
| KR | 20170054722 A | 5/2017 |
| KR | 20180116667 A | 10/2018 |
| WO | 2012150506 A2 | 11/2012 |

\* cited by examiner

FIG. 10
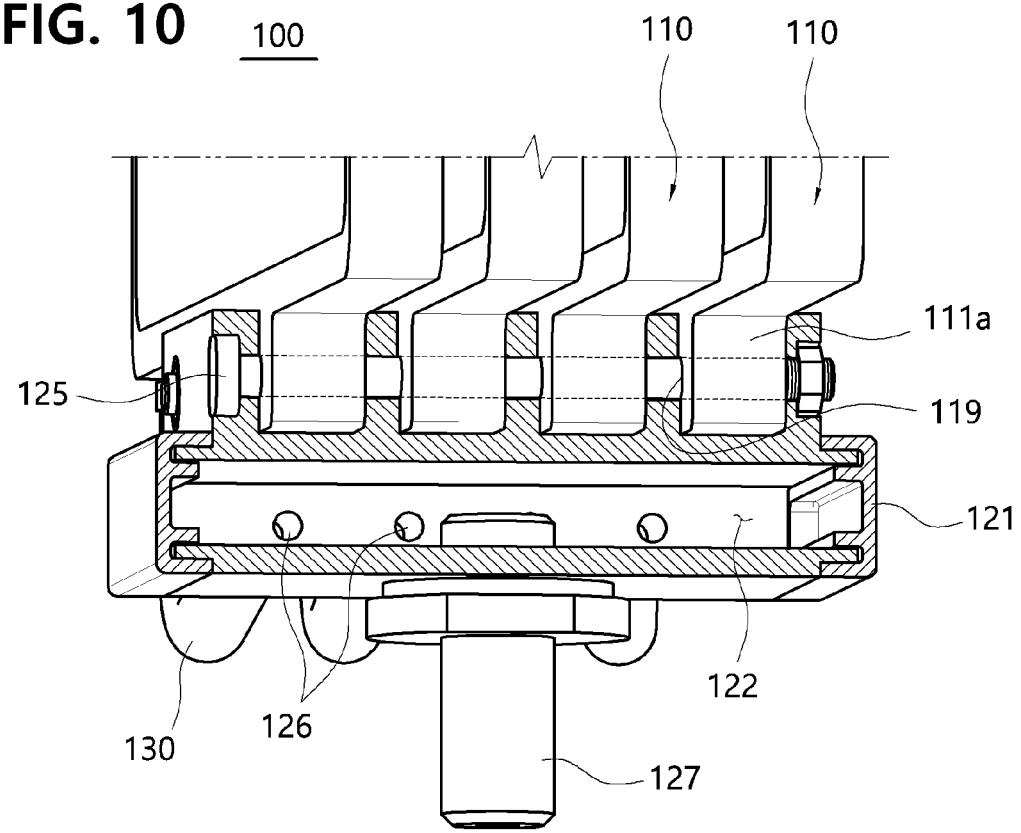
FIG. 11
(a) 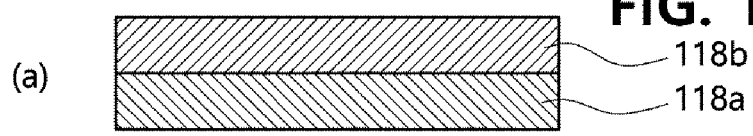
(b) 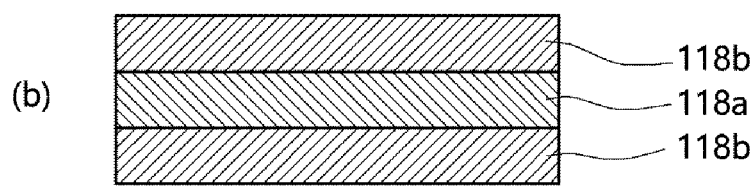

MANIFOLD ASSEMBLIES FOR FILTERS

CROSS REFERENCE TO RELATED APPLICATIONS

This application is a national phase entry of International Application No. PCT/KR2021/005305, filed on Apr. 27, 2021, designating the United States, which is based upon and claims priority to Korean Patent Application 10-2020-0051425, filed on Apr. 28, 2020, the entire contents of which are incorporated herein by reference.

TECHNICAL FIELD

The present invention relates to a filter module for a gravity-type water-purifying device and a gravity-type water-purifying device including the same.

BACKGROUND

Supplying clean and safe water is essentially necessary for health and survival of humans. However, since clean water is not sufficiently supplied in Africa or developing countries, water in a contaminated pond or puddle is frequently used as drinking water.

When contaminated water is drunk, a variety of infectious diseases may occur due to microbes included in the contaminated water. In this case, there is a problem that the infectious diseases cause illness such as abdominal pain, diarrhea, vomiting and the like, and in a severe case are life-threatening.

Accordingly, in order to prevent such problem, it is important to ensure that the food or water we eat is not contaminated by microbes.

Currently, merely if clean water and sufficient food are secured in developing countries, the overall mortality rate can be reduced, and thus, it can be said that the effect of environmental improvement, which can be achieved by supplying clean water, is far greater than advances in medicine or treatment technology.

However, since a conventional water purifier employs a principle of passing raw water through a filter by applying a certain water pressure to purify the raw water, a pump facility capable of providing the certain water pressure is required, and to this end, an electrical facility must also be provided. In the absence of such facilities, there is a limitation that the conventional water purifier cannot be used.

SUMMARY OF THE INVENTION

The present invention has been devised in view of the above points, and an object of the present invention is to provide a filter module for a gravity-type water-purifying device and a gravity-type water-purifying device capable of conveniently producing filtered water by using gravity.

Another object of the present invention is to provide a filter module for a gravity-type water-purifying device and a gravity-type water-purifying device in which the filter module is composed of separate modules that are detachable from each other so that only some broken and damaged parts can be individually replaced.

One aspect of the present invention provides a filter module for a gravity-type water-purifying device, comprising: a plurality of plate-shaped filter members, which are respectively formed in a plate shape having a predetermined area, produce filtered water from raw water introduced from the outside, and are spaced apart from each other in parallel along one direction while one surface of each filter member faces each other at a predetermined interval; and a filtered water-integrating member for fixing one side of each of the plate-shaped filter members so that the plurality of plate-shaped filter members can be kept spaced apart from each other along one direction while facing each other, and for integrating and discharging the filtered water individually produced from each of the plurality of plate-shaped filter members.

In addition, the plate-shaped filter member may comprise: a support frame including a loop-shaped edge member having an empty space with both surfaces open, and a partition member coupled to the edge member so that the empty space can be comparted into a plurality of storage spaces; a pair of filtration members formed in a plate shape having a predetermined area and coupled to both surfaces of the support frame to produce filtered water from raw water moving from the outside to the plurality of storage spaces; at least one communication path formed in the partition member to allow the plurality of storage spaces to communicate with each other; and a receiving port provided on one side of the support frame so as to communicate with any one of the plurality of storage spaces and connected to the filtered water-integrating member via a tube.

Further, the communication path may be an accommodation groove formed to be recessed into the partition member.

Further, the edge member may include a stepped portion formed along the inner side of the edge, and an edge side of the filtration member may be fixed to the stepped portion.

Further, the partition member may include at least one lateral member having a predetermined length and at least one longitudinal member disposed to intersect the lateral member.

Further, the filtration member may include a plate-shaped support having a predetermined area and a nanofiber web layer formed of nanofiber on one surface or both surfaces of the support.

In addition, all of the plurality of plate-shaped filter members may be provided with the same filter member.

In addition, the filtered water-integrating member may include: a body having an integration space for integrating the filtered water introduced from each of the plurality of plate-shaped filter members; a plurality of protrusions protruding from one surface of the body to form a plurality of accommodation grooves into which one side of the plurality of plate-shaped filter members are respectively inserted; and a fastening member fastened to the body and passing through all of the plurality of protrusions so as to prevent each of the plate-shaped filter members respectively inserted into the plurality of accommodation grooves from being separated from the accommodation grooves.

In addition, the body may further include a plurality of inlets connected one-to-one to receiving ports through a tube so as to introduce the filtered water individually produced by the plurality of plate-shaped filter members into the integration space, and at least one outlet for discharging the filtered water from the integration space to the outside, wherein each of the receiving ports are respectively provided in each of the plurality of plate-shaped filter members.

Another aspect of the present invention provides a gravity-type water-purifying device including: a housing having a filtration space in which raw water is stored; and the above-described filter module for a gravity-type water-purifying device disposed in the filtration space to filter out foreign substances included in the raw water.

According to the present invention, filtered water can be simply produced by using gravity even under poor conditions in which power such as electricity is not supplied, thereby obtaining clean filtered water even in a poor environment. As such, it is possible to simply obtain filtered water even in a poor environment, thereby preventing diseases caused by ingestion of contaminated water and improving the quality of life.

In addition, according to the present invention, since the filter module is composed of separate modules detachable from each other, only some parts that are broken or damaged can be individually replaced, thereby reducing maintenance costs.

BRIEF DESCRIPTION OF THE DRAWINGS

FIG. 10 shows a relationship in which a filtered water-integrating member and plate-shaped filter members are coupled in a filter module for a gravity-type water-purifying device according to one embodiment of the present invention.

FIG. 11 is a schematic diagram showing a detailed configuration of a filtration member applicable to a filter module for a gravity-type water-purifying device according to one embodiment of the present invention.

DETAILED DESCRIPTION

Figure 1:
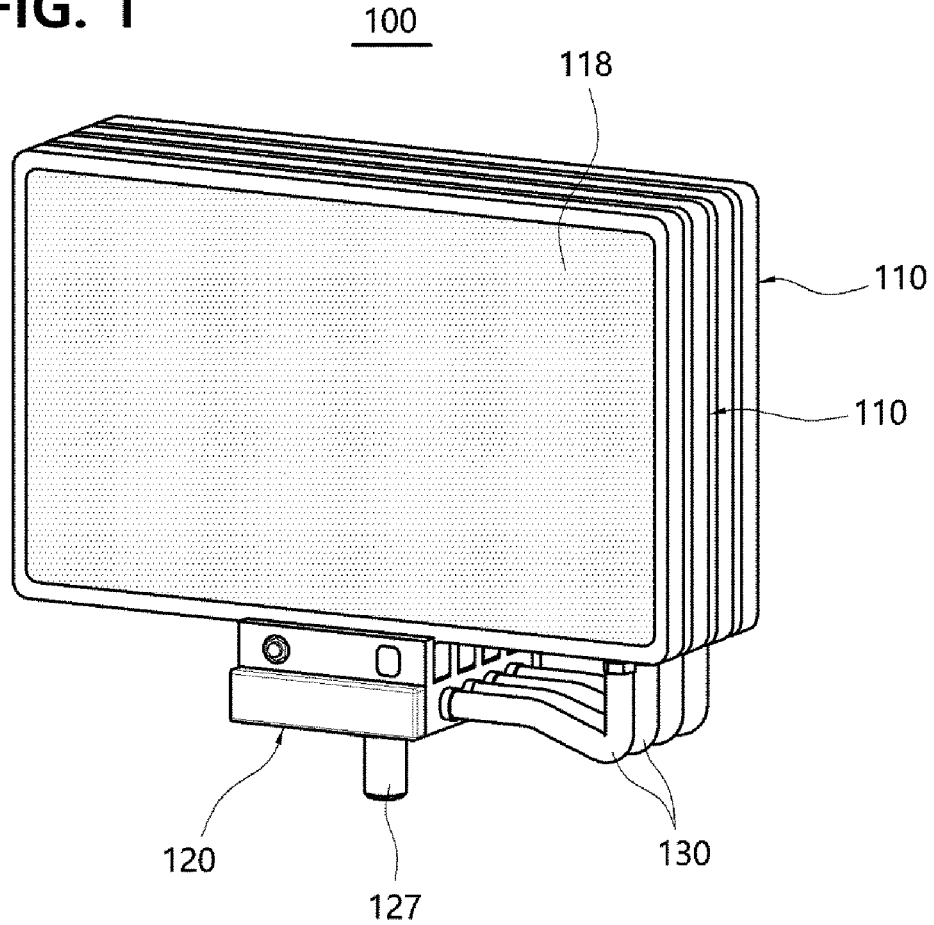
FIG. 1 shows a filter module for a gravity-type water-purifying device according to one embodiment of the present invention.

Hereinafter, with reference to the accompanying drawings, embodiments of the present invention will be described in detail so as to be easily implemented by one of ordinary skill in the art to which the present invention pertains. The present invention may be embodied in a variety of forms and is not be limited to the embodiments described herein. In order to clearly describe the present invention in the drawing, parts irrelevant to the description are omitted from the drawings; and throughout the specification, same or similar components will be referred to as like reference numerals.

A filter module 100 for a gravity-type water-purifying device according to one embodiment of the present invention may produce filtered water from raw water by using water pressure due to gravity or potential energy.

That is, the filter module 100 for a gravity-type water-purifying device according to one embodiment of the present invention may produce the filtered water by filtering out foreign substances contained in the raw water in the course of passing the raw water around the filtration member 118 through the filtration member 118 by the water pressure due to gravity or potential energy.

Figure 2:
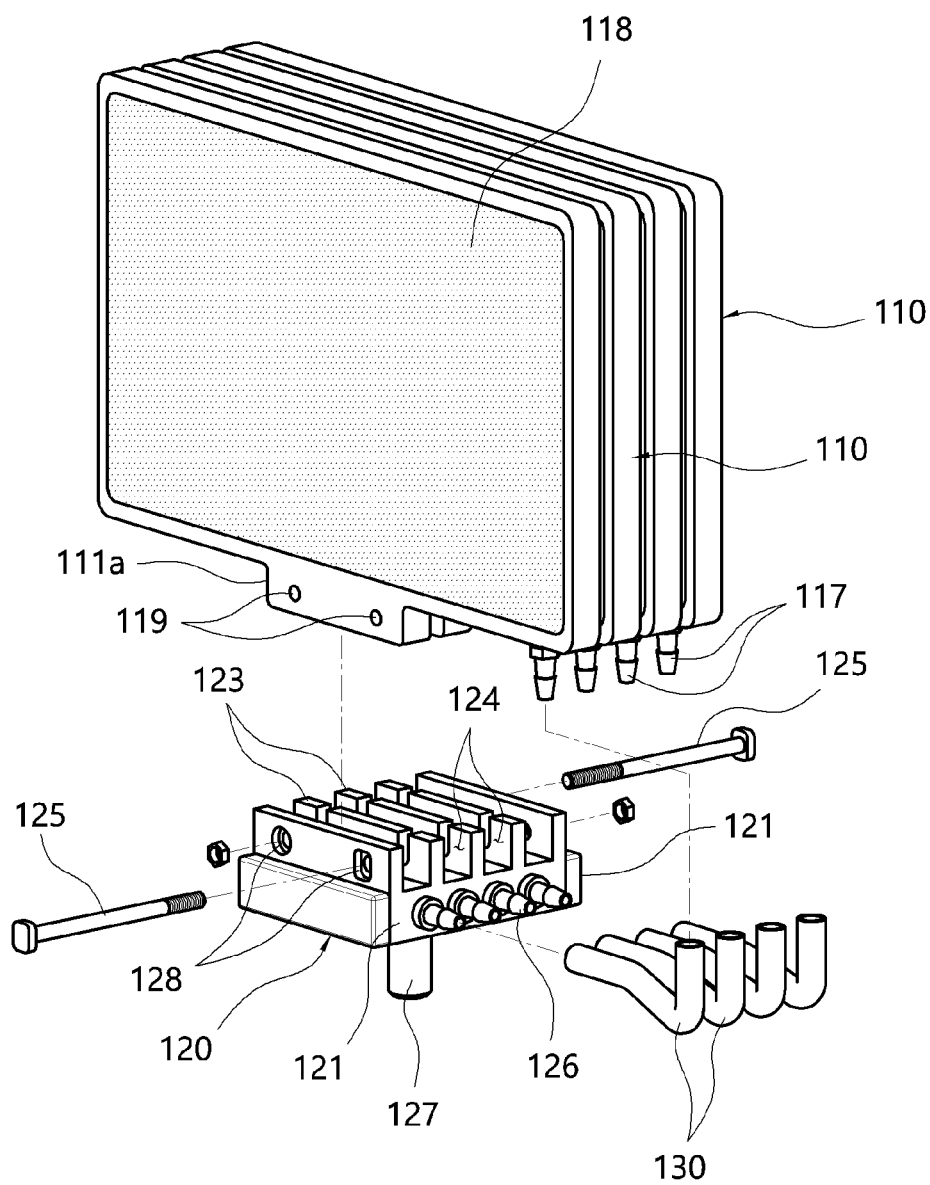
FIG. 2 is an exploded view of the filter module of FIG. 1.
Figure 3:
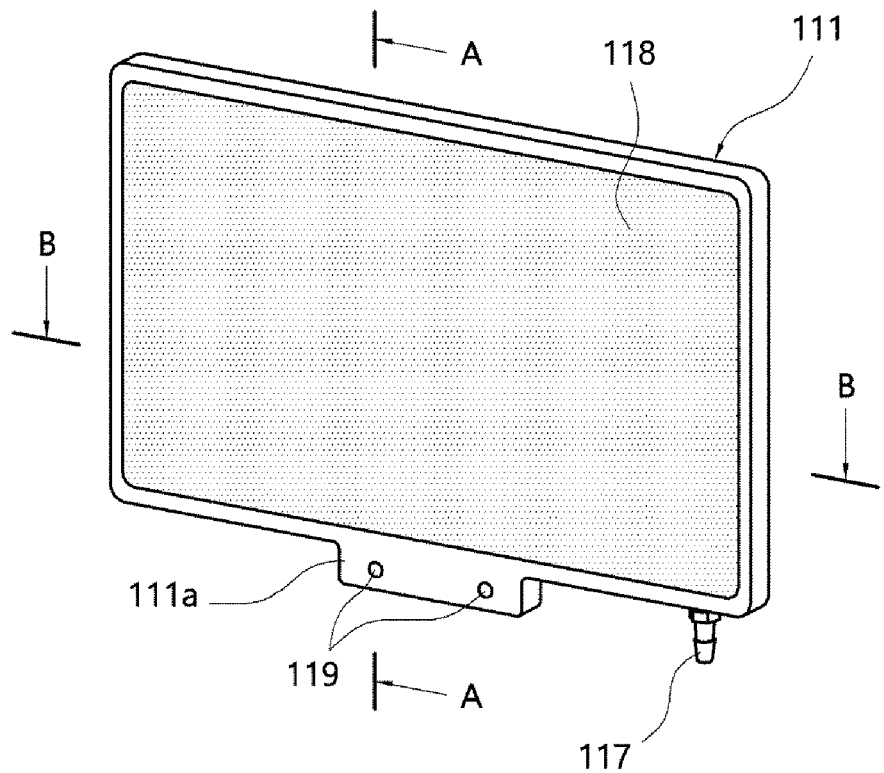
FIG. 3 shows a plate-shaped filter member applicable to a filter module for a gravity-type water-purifying device according to one embodiment of the present invention.

The filter module 100 for a gravity-type water-purifying device according to one embodiment of the present invention includes a plurality of plate-shaped filter members 110 and a filtered water-integrating member 120 as shown in FIGS. 1 and 2.

The plurality of plate-shaped filter members 110 may produce the filtered water from the raw water by using water pressure caused by gravity or potential energy in a state in which at least a portion thereof is submerged in the raw water.

In this case, the plurality of plate-shaped filter members 110 may be formed in a plate shape having a predetermined area, and be spaced apart from each other in parallel along one direction while one surface of each filter member faces each other at a predetermined interval.

Accordingly, in the filter module 100 for a gravity-type water-purifying device according to one embodiment of the present invention, each of the plate-shaped filter members 110 may individually produce the filtered water, thereby enhancing the output of filtered water per unit time.

In this case, the plurality of plate-shaped filter members 110 may be provided to have different configurations, but may also be formed of the same filter member.

Accordingly, in the filter module 100 for a gravity-type water-purifying device according to one embodiment of the present invention, all of the plurality of plate-shaped filter members 110 may be manufactured by using one mold or manufacturing facility, thereby reducing the production cost for producing the plate-shaped filter members.

In addition, in the filter module 100 for a gravity-type water-purifying device according to one embodiment of the present invention, the total number of use of the plate-shaped filter member 110 may be easily adjusted according to the amount of filtered water required per hour, thereby enhancing the convenience of use.

The plate-shaped filter member 110 may include a support frame 111, a pair of filtration members 118, a communication path 116 and a receiving port 117 as shown in FIGS. 3 to 6.

The support frame 111 may support the pair of filtration members 118 and also provide a space for temporarily storing the filtered water produced by the filtration members 118.

To this end, the support frame 111 may include a loop-shaped edge member 112 having an empty space therein, and a partition member 114 coupled to the edge member 112 so that the empty space may be comparted into a plurality of storage spaces 115.

Figure 4:
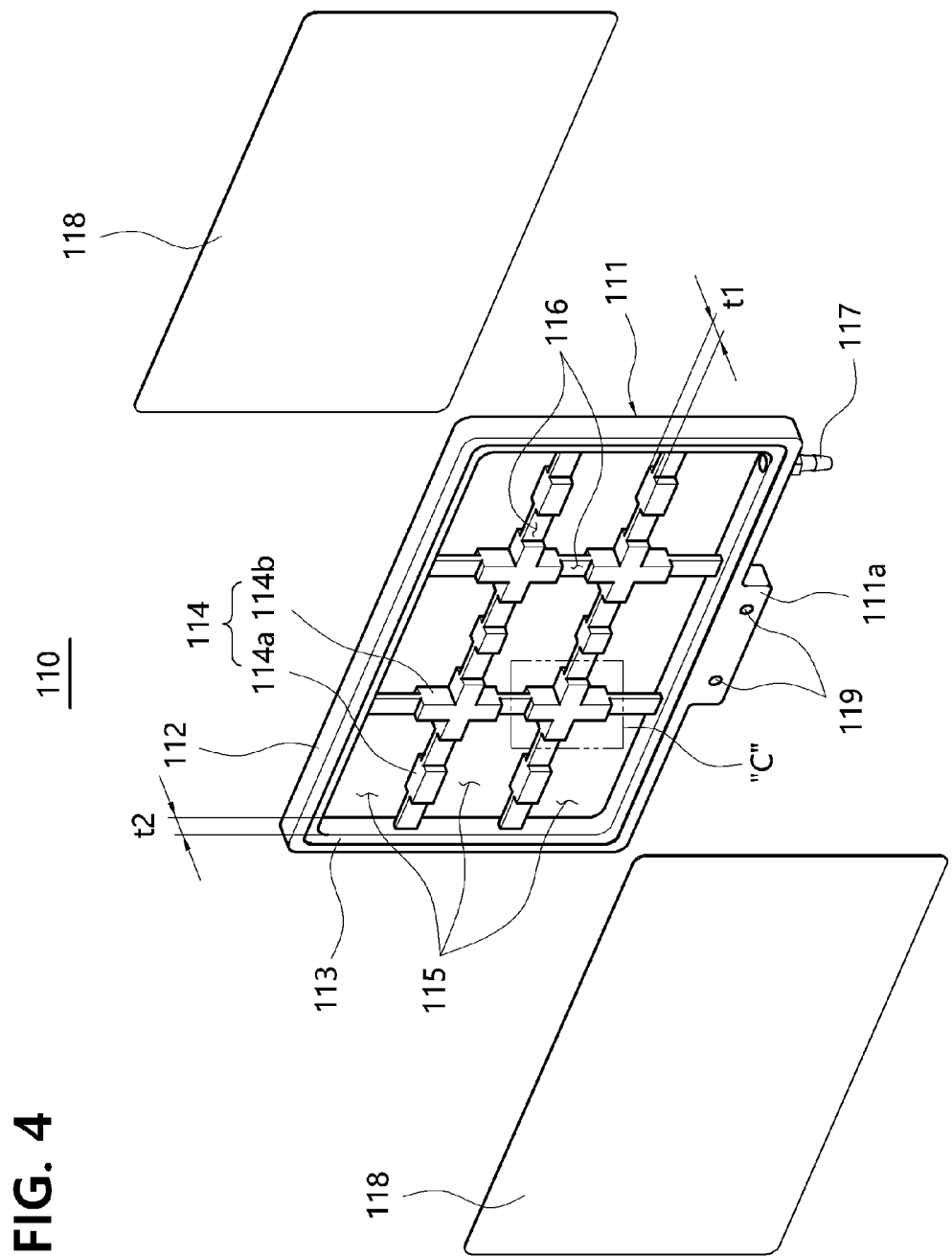
FIG. 4 shows a state in which the filtration member of FIG. 3 is separated.

For example, as shown in FIG. 4, the edge member 112 may be a rectangular frame structure with both surfaces open, and the partition member 114 may be a straight member connecting two opposite sides of the edge member 112.

Further, the partition member 114 may include at least one lateral member 114a having a predetermined length and at least one longitudinal member 114b disposed to intersect the lateral member 114a.

Figure 5:
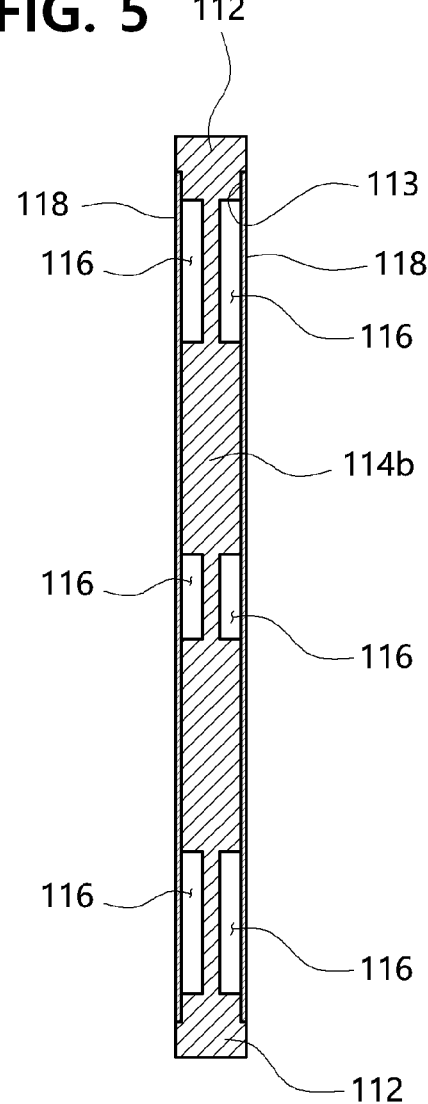
FIG. 5 is a cross-sectional view taken along line A-A of FIG. 3.
Figure 6:
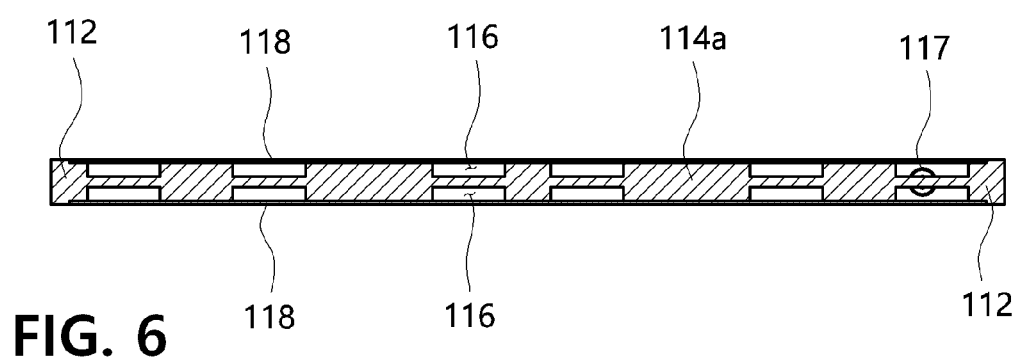
FIG. 6 is a cross-sectional view taken along line B-B of FIG. 3.

Accordingly, as shown in FIGS. 5 and 6, when the pair of filtration members 118 are attached to both surfaces of the edge member 112, respectively, the pair of filtration members 118 may be respectively supported by both surfaces of the edge member 112, and may be kept spaced apart from each other by the thickness of the edge member 112.

For example, the filtration member 118 may be provided in a form of a plate-shaped sheet, and the edge side thereof may be attached to one surface of the edge member 112.

Accordingly, the filtration member 118 may be maintained in a plate-like shape by the support frame 111, and may increase the output or flow rate of filtered water by increasing the contact area with the raw water.

However, the shape of the frame member 112 is not limited thereto, and may be appropriately changed to any one of a circular shape, an arc shape, a polygonal shape, and a combination thereof depending on the shape of the filtration member 118.

In addition, the partition member 114 may be composed of only any one of the lateral member 114a and the longitudinal member 114b, and in case any one of the lateral member 114a and the longitudinal member 114b is provided in plurality, the plurality of lateral member 114a or the plurality of longitudinal member 114b may be arranged to be spaced apart and parallel to each other.

In this case, the partition member 114 may serve to compart the empty space into a plurality of storage spaces 115 and also support the filtration member 118.

Accordingly, the edge of the filtration member 118 may be supported by the edge member 112, and the remaining inner region of the filtration member 118 except for the edge thereof may be supported by the partition member 114.

As a result, when the filtration member 118 is provided as a plate-shaped sheet having a predetermined area, even if water pressure is applied to the filtration member 118 while the raw water passes through the filtration member 118, the filtration member 118 may be maintained in a plate-like shape without being bent or deformed by the water pressure.

In this case, the edge member 112 may include a stepped portion 113 formed to be recessed inward to a certain depth along the inner side of the edge, and the stepped portion 113 may be formed on each of both surfaces of the edge member 112.

In such a case, as shown in FIG. 4, a thickness t2 of the edge member 112 in the portion where the stepped portion 113 is formed may have the same thickness as a thickness t1 of the partition member 114.

Accordingly, when the pair of filtration member 118 are respectively attached to both surfaces of the support frame 111, the edge of the filtration member 118 may be in close contact with the stepped portion 113 as shown in FIG. 5; the inner region of the filtration member 118 may be supported by the partition member 114; and the edge portion and inner portion of the filtration member 118 may form a horizontal plane.

Figure 7:
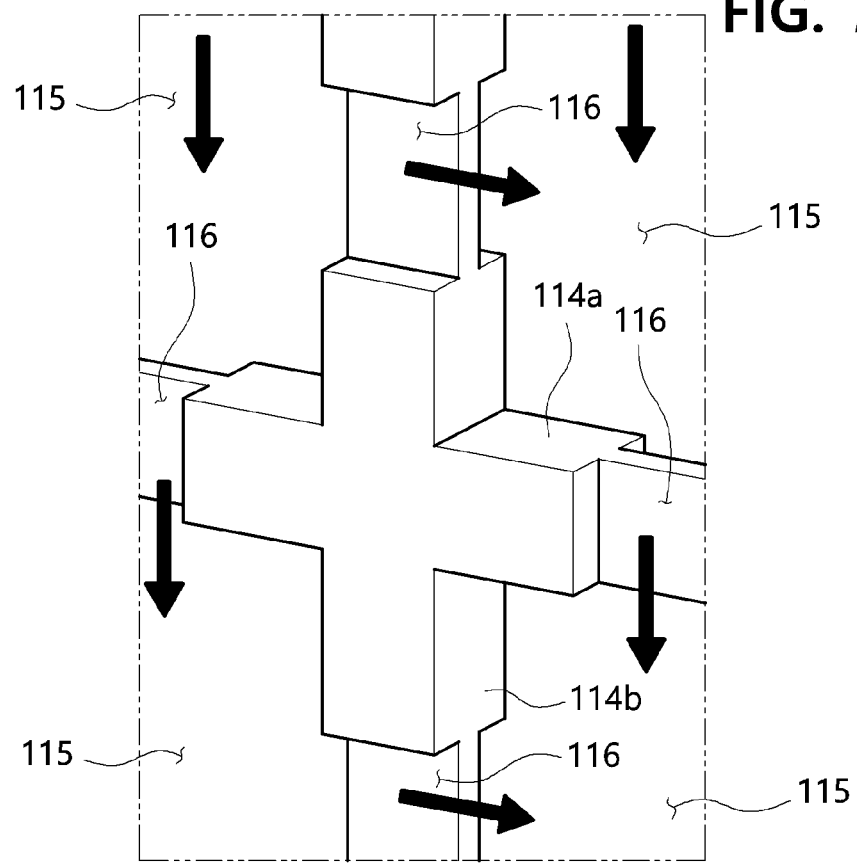
FIG. 7 is an enlarged view of part C in FIG. 5.

The at least one communication path 116 may be formed in the partition member 114. As shown in FIG. 7, the communication path 116 may connect a plurality of storage spaces 115 formed inside the edge member 112 through the partition member 114.

Accordingly, the filtered water produced while passing through the filtration member 118 may move toward the receiving port 117 via the plurality of storage spaces 115.

For example, in a case in which the partition member 114 includes both the lateral member 114a and the longitudinal member 114b, the communication path 116 may be formed in each of the lateral member 114a and the longitudinal member 114b.

In addition, the communication path 116 may be a through-hole formed through the lateral member 114a and the longitudinal member 114b, or an accommodation groove formed to be recessed inwardly from one surface of the lateral member 114a and the longitudinal member 114b. In such a case, the bottom surface of the communication path 116 may face one surface of the filtration member 118.

That is, when the pair of filtration member 118 are respectively attached to both surfaces of the support frame 111, the communication path 116 may be formed on each of both surfaces of the partition member 114 so that the bottom surface thereof may face one surface of the pair of filtration members 118, respectively.

Accordingly, the filtration member 118 may produce the filtered water not only in an area corresponding to the storage space 115, but also in a portion of the partition member 114 where the communication path 116 is formed.

As a result, even if the partition member 114 supports the inner region of the filtration member 118, an area in which the filtered water may not be produced may be minimized, thereby further increasing the output of filtered water.

Although the drawings show that the communication paths 116 formed on each of both surfaces of the partition member 114 are formed at positions overlapping each other, the formation position of the communication path 116 is not limited thereto, and the position of the communication path formed on one surface of the partition member 114 may not overlap with the position of the communication path formed on the opposite surface.

The filtration member 118 may be provided in a pair as described above and may be attached to each of both surfaces of the support frame 111.

The above filtration member 118 may filter foreign substances contained in the raw water while the raw water to be filtered moves from the outside of the filtration member 118 to the storage space 115 by gravity or water pressure.

In this case, the filtration member 118 may be provided as a plate-shaped sheet so as to increase the contact area with the raw water.

Here, although any known filtration member used for water treatment may be applied as the filtration member 118, the filtration member 118 may also be a plate-shaped sheet in which a nanofiber web layer 118b is formed on one or both surfaces of the support 118a as shown in FIG. 11.

In the present invention, the nanofiber web layer 118b may filter out foreign substances contained in the raw water, and the support 118a may serve to support the nanofiber web layer 118b and serve as a moving passage for diffusing the filtered water produced by the nanofiber web layer 118b over the entire area of the filtration member 118.

As a non-limiting example, the filtration member 118 may have a two-layer structure in which the nanofiber web layer 118b is directly attached to one surface of the support 118a as shown in (a) of FIG. 11.

Alternatively, the filtration member 118 may have a three-layer structure in which a pair of nanofiber web layers 118b are directly attached to both surfaces of the support 118a, respectively, as shown in (b) of FIG. 11. In such a case, even if the nanofiber web layer 118b attached to the outside of the support 118a among the nanofiber web layers 118b attached to both sides of the support 118a is damaged through an operation such as removing foreign substances attached to the surface thereof, the nanofiber web layer 118b attached to the inside of the support 118a may be maintained in its original shape, and thus, the filtered water passing through the support 118a may be filtered again, thereby improving the quality of the filtered water.

In this case, the nanofiber web layer 118b may be laminated to one surface of the support 118a through thermal welding, ultrasonic welding, high-frequency welding, etc., and one surface of the support 118a in the filtration member 118 may be attached to one surface of the support frame 111 through ultrasonic welding.

In addition, the support 118a may be a porous substrate so that the filtered water produced through the nanofiber web layer 118b may be diffused. For example, the support 118a may be any one of commonly used known woven, knitted, or non-woven fabrics.

Further, the nanofiber web layer 118b may be formed of nanofibers to filter out foreign substances contained in the liquid to be filtered, and the nanofiber web layer 118b may include a nanofiber web of a three-dimensional network structure.

In this case, the nanofiber may include a fiber-forming component, including polyacrylonitrile (PAN) and polyvinylidene fluoride (PVDF), and an emulsifier for improving the miscibility of the fiber-forming component.

The nanofiber web layer 118b may be provided as a single layer or as a multilayer.

The receiving port 117 may discharge the filtered water produced through the filtration member 118 from the plurality of storage spaces 115 to the outside.

To this end, the receiving port 117 may be provided on one side of the support frame 111 to communicate with any one of the plurality of storage spaces 115.

Accordingly, the filtered water produced through the filtration member 118 may move from each storage space 115 to the storage space 115 in communication with the receiving port 117 through the communication path 116 and be discharged to the outside through the receiving port 117.

The filtered water-integrating member 120 may fix one side of each of the plate-shaped filter members 110 so that the plurality of plate-shaped filter members 110 may be kept spaced apart from each other along one direction while facing each other, and may integrate the filtered water individually produced from each of the plurality of plate-shaped filter members 110.

That is, the filtered water-integrating member 120 may serve as a coupling member for fixing the plurality of plate-shaped filter members 110 and also serve as a collecting member for integrating the filtered water produced from each of the plate-shaped filter members 110 into one.

Figure 8:
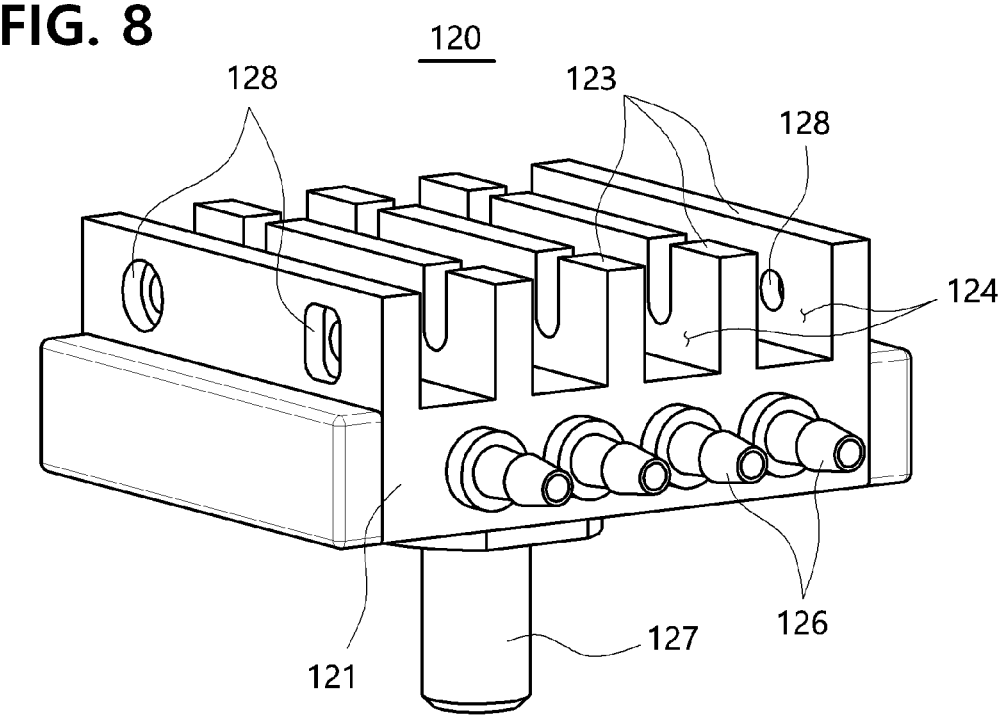
FIG. 8 shows a filtered water-integrating member applicable to a filter module for a gravity-type water-purifying device according to one embodiment of the present invention.
Figure 9:
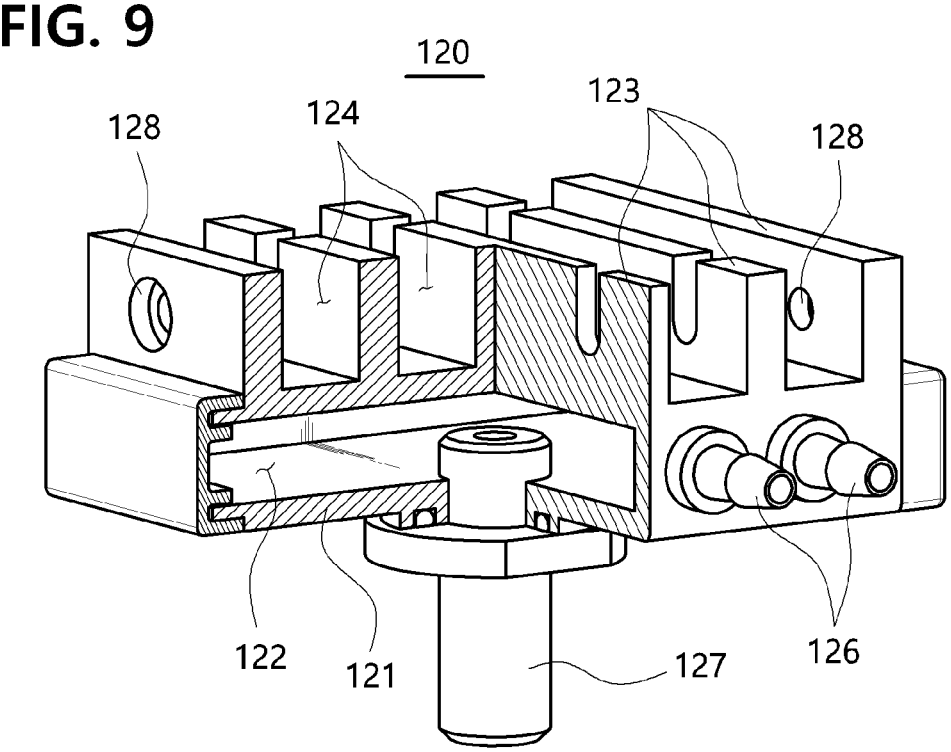
FIG. 9 shows a state in which a part is cut away from FIG. 8.

To this end, the filtered water-integrating member 120 may include a body 121, a plurality of protrusions 123, a fastening member 125, a plurality of inlets 126 and at least one outlet 127, as shown in FIGS. 8 to 10, wherein the plurality of inlets 126 may be connected one-to-one with the receiving ports 117 provided in each of the plate-shaped filter members 110 via a tube 130.

Specifically, an integration space or hollow cavity 122 for integrating the filtered water introduced from each of the plate-shaped filter members 110 through the inlet 126 connected to the tube 130 may be formed inside the body 121, and a plurality of inlets 126 connected to the tube 130 may be formed at one side of the body 121. In addition, at least one outlet 127 for discharging the filtered water integrated in the integration space 122 to the outside may be formed on one side of the body 121.

Accordingly, the filtered water produced from each of the plate-shaped filter members 110 may be moved to the integration space 122 through the receiving port 117, the tube 130 and the inlet 126, and the filtered water introduced into the integration space 122 may be discharged to the outside through the outlet 127.

In this case, the plurality of protrusions 123 may be formed to protrude at a certain height from one surface of the body 121, and may be disposed to be spaced apart from each other at a predetermined interval.

Accordingly, an accommodation groove 124 into which one side of the plate-shaped filter member 110 is inserted may be formed between two adjacent protrusions 123.

Here, the plate-shaped filter member 110 may include a coupler 111a formed on one side of the support frame 111 to protrude outward by a certain length, wherein the coupler 111a may be inserted into the accommodation groove 124.

Accordingly, when the coupler 111a provided in each of the plurality of plate-shaped filter members 110 are respectively inserted into the plurality of accommodation grooves 124 formed on one side of the body 121, the plurality of plate-shaped filter members 110 may be arranged along one direction so that each one surface thereof faces each other, and be kept spaced apart from each other by the thickness of the protrusions 123.

Thus, both surfaces of each of the plate-shaped filter members 110 may be in contact with the raw water smoothly.

As described above, the filtered water-integrating member 120 may perform both a function of integrating the filtered water individually produced through each of the plate-shaped filter members 110 into one and a role of fixing each of the plate-shaped filter members 110.

Here, the filtered water-integrating member 120 may include at least one fastening member 125 that is detachably coupled to the body 121, wherein the at least one fastening member 125 may prevent the plate-shaped filter members 110 respectively inserted into the plurality of accommodation grooves 124 from being separated from the accommodation grooves 124.

That is, the fastening member 125 may include a fastening bar having a predetermined length, wherein the fastening bar may be fastened to the body 121 to pass through all of the plurality of protrusions 123.

In such a case, a fastening hole 128 may be formed through the plurality of protrusions 123 to allow the fastening member 125 to pass therethrough, and a through-hole 119 may be formed through the coupler 111a at a position corresponding to the fastening hole 128.

Accordingly, when the fastening bar is fastened to the body 121 to pass through the fastening hole 128 provided in each of the plate-shaped filter member 110 and the through-hole 119 formed in each of the plurality of protrusions 123 in a state in which the coupler 111a provided in each of the plate-shaped filter members 110 is inserted into the accommodation groove 124, each of the plate-shaped filter members 110 may be fixed to the body 121 in a state in which the coupler 111a is inserted into the accommodation groove 124.

Thus, the plate-shaped filter members 110 respectively inserted into the plurality of accommodation grooves 124 may be prevented from being separated from the accommodation groove 124 by the fastening bar.

Accordingly, in the filter module 100 for a gravity-type water-purifying device according to one embodiment of the present invention, the total number of use of the plate-shaped filter member 110 fixed to the body 121 may be easily adjusted according to the amount of filtered water required per hour, thereby enhancing the convenience of use.

In addition, in the filter module 100 for a gravity-type water-purifying device according to one embodiment of the present invention, each of the plate-shaped filter members 110 may be detachably coupled to the body 121, and thus, only the plate-shaped filter members requiring replacement among the plurality of plate-shaped filter members 110 may be individually replaced.

Accordingly, the filter module 100 for a gravity-type water-purifying device according to one embodiment of the present invention may enhance the convenience of use and reduce maintenance costs.

That is, in the filter module 100 for a gravity-type water-purifying device according to one embodiment of the present invention, the plurality of plate-shaped filter members 110 and the filtered water-integrating member 120 may be composed of separate modules that are detachable from each other, and thus, only some broken and damaged parts may be individually replaced, thereby reducing maintenance costs.

Meanwhile, the above-described filter module 100 for a gravity-type water-purifying device may be applied to a gravity-type water-purifying device 200 that produces filtered water from raw water by using gravity.

Figure 12:
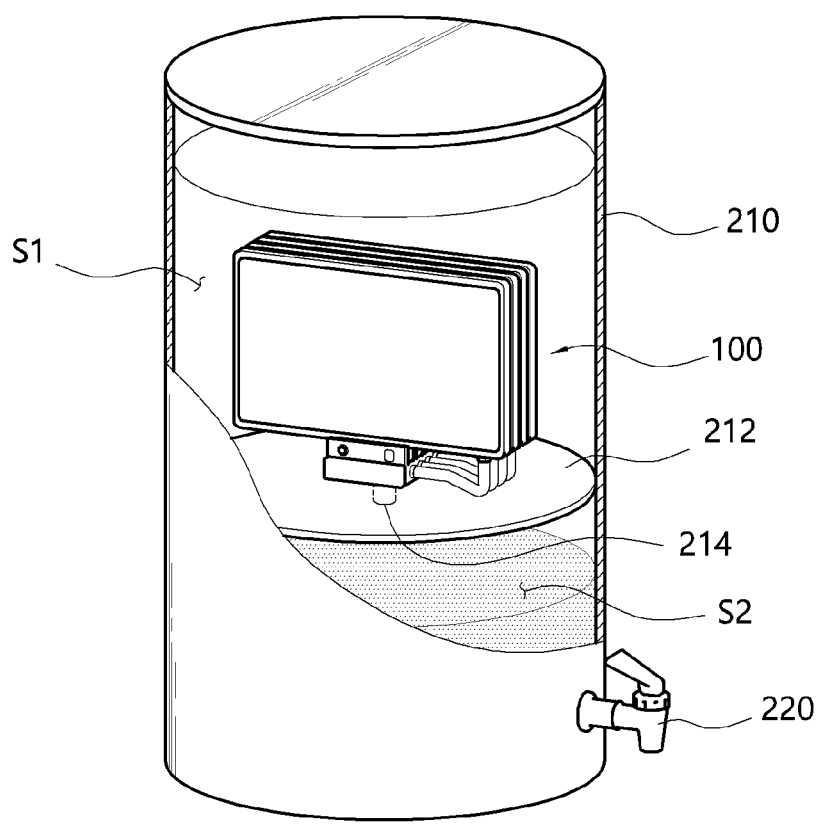
FIG. 12 is a schematic diagram illustrating a gravity-type water-purifying device to which a filter module for a gravity-type water-purifying device according to one embodiment of the present invention is applied.

That is, the gravity-type water-purifying device 200 according to one embodiment of the present invention may include a housing 210 and the aforementioned filter module 100 for a gravity-type water-purifying device, as shown in FIG. 12.

Specifically, the housing 210 may include a filtration space S1 for storing raw water to be treated, and the filter module 100 for a gravity-type water-purifying device may be disposed in the filtration space S1.

Here, although the housing 210 may include only the filtration space S1 for storing raw water to be treated, it may further include a filtered water storage space S2 for storing the filtrated water produced through the filter module 100 for a gravity-type water-purifying device.

For example, the housing 210 may be formed in a box shape having an internal space of a predetermined volume as shown in FIG. 12, wherein the internal space may be divided into the filtration space S1 and a filtered water storage space S2 by a partition plate 212 disposed inside the housing 210.

In addition, an opening/closing means 220 for discharging the filtered water stored in the filtered water storage space S2 to the outside during use may be provided on one side of the housing 210, wherein the opening/closing means 220 may be a known opening/closing valve that allows or blocks the discharge of filtered water to the outside through a user's manipulation.

In such a case, the partition plate 212 may include a coupling hole 214 that communicates the filtration space S1 and the filtered water storage space S2, and the outlet 127 of the body 121 may be detachably coupled to the coupling hole 214.

That is, in the filter module 100 for a gravity-type water-purifying device, the outlet 127 provided in the filtered water-integrating member 120 may serve to discharge the filtered water collected in the integration space 122 to the outside and also serve as a fastener for fastening the filter module 100 for a gravity-type water-purifying device to the partition plate 212.

Accordingly, the gravity-type water-purifying device 200 according to one embodiment of the present invention may produce filtered water by using the filter module 100 for a gravity-type water-purifying device in the filtration space S1, and the filtered water produced in the filtration space S1 by the filter module 100 for a gravity-type water-purifying device may move to the filtered water storage space S2 through the outlet 127.

As a result, the gravity-type water-purifying device 200 according to one embodiment of the present invention may easily produce filtered water without using additional power such as electricity, and thus, filtered water may be easily produced even in a harsh environment where infrastructure such as electricity is not installed or electricity is difficult to supply.

Although one embodiment of the present invention have been described above, the spirit of the present invention is not limited to the embodiment presented in the subject specification; and those skilled in the art who understands the spirit of the present invention will be able to easily suggest other embodiments through addition, changes, elimination, and the like of elements without departing from the scope of the same spirit, and such other embodiments will also fall within the scope of the present invention.

The invention claimed is:

1. A manifold assembly (120) for receiving filtered water from a plurality of filter plates (110) comprising:
    a body (121) defining a hollow cavity (122) for receiving filtered water from the plurality of filter plates (110);
    a plurality of elongated protrusions (123) vertically extending from, and along, a top surface of the body (121), each of the plurality of elongated protrusions (123) being parallel to each other and being uniformly spaced from any adjacent elongated protrusions (123), defining a plurality of grooves (124) each wide enough to receive one of the plurality of filter plates (110);
    at least two fastening holes (128) extending through each of the plurality of elongated protrusions (123), each of the two fastening holes (128) in adjacent of elongated protrusions (123) being axially aligned such that a fastener (125) may be inserted through all of the aligned fastening holes (128);
    a plurality of inlets (126) for introducing filtered water from the plurality of filter plates (110) into the hollow cavity (122); and
    an outlet (127) extending through a bottom wall of the body (121) and positioned so that the hollow cavity (122) could drain by gravity through the outlet (127).

2. The manifold assembly (120) of claim 1, further comprising:
    a plurality of fasteners (125) each comprising a bar or a bolt.

3. The manifold assembly (120) of claim 1, wherein the plurality of elongated protrusions (123) includes an end elongated protrusion (123) at each end of the plurality of elongated protrusions (123) and at least one intermediate elongated protrusion (123) between the end elongated protrusions (123), the at least one intermediate elongated protrusion (123) having upwardly extending, open, U-shaped fastening holes (128).

4. A filter module (100) comprising:
    a manifold assembly (120) for receiving filtered water from a plurality of filter plates (110) including:
        a body (121) defining a hollow cavity (122) for receiving filtered water from the plurality of filter plates (110);
        a plurality of elongated protrusions (123) vertically extending from, and along, a top surface of the body (121), each of the plurality of elongated protrusions (123) being parallel to each other and being uniformly spaced from any adjacent elongated protrusions (123), defining a plurality of grooves (124) each wide enough to receive one of the plurality of filter plates (110);
        at least two fastening holes (128) extending through each of the plurality of elongated protrusions (123), each of the two fastening holes (128) in adjacent of elongated protrusions (123) being axially aligned such that a fastener (125) may be inserted through all of the aligned fastening holes (128);

a plurality of inlets (126) for introducing filtered water from the plurality of filter plates (110) into the hollow cavity (122); and an outlet (127) extending through a bottom wall of the body (121) and positioned so that the hollow cavity (122) could drain by gravity through the outlet (127);

a plurality of filter plates (110) each including:

a support frame (111) with a coupler (111*a*) extending from a bottom surface of the support frame (111), the coupler (111*a*) having at least two through holes, an outlet (117) extending through a bottom surface of the support frame (111), and each filter plate (111) being received in a respective groove (124);

a plurality of fasteners (125) extending through each of the at least two fastening holes (128) and through each corresponding axially aligned through-hole in each coupler (111*a*) to securely couple the filter plates (111*a*) in their respective grooves (124); and a plurality of tubes (130) coupled to the outlets (117) of each filter plate (110) and a respective one of the plurality of inlets (126) of the manifold assembly (120).

5. A water-purifying device (200) comprising:

a housing (210) defining an interior volume (S1) for holding unfiltered water, and, including a partition plate (212) including a coupling hole (214) extending therethrough; and a filter module (100) as specified in claim 4, disposed within the interior volume (S1), the outlet (127) being fluidically connected to the coupling hole (214) so that filtered water may exit the interior volume (S1).

6. The water-purifying device (200) of claim 5, further comprising:

a lower chamber (S2) for receiving filtered water exiting the outlet (127).

7. The water-purifying device (200) of claim 6, further comprising a valve (220) in fluid communication with the lower chamber (S2) for controlling egress of filtered water from the lower chamber (S2).

\* \* \* \* \*